United States Patent
Butler et al.

(10) Patent No.: US 10,692,069 B2
(45) Date of Patent: *Jun. 23, 2020

(54) SYSTEMS FOR PROVIDING AND PROCESSING SURPRISE CONDITIONAL GIFTS

(71) Applicant: Capital One Services, LLC, McLean, VA (US)

(72) Inventors: Taurean Butler, Brooklyn, NY (US); Christine Berglund, Brooklyn, NY (US); Adam Vukich, Alexandria, VA (US); Jessica Greenberg, New York, NY (US); Colin Hart, Arlington, VA (US); Mykhaylo Bulgakov, Arlington, VA (US); Jason Ji, Reston, VA (US); Kaylyn Gibilterra, New York, NY (US)

(73) Assignee: CAPITAL ONE SERVICES, LLC, McLean, VA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/520,504

(22) Filed: Jul. 24, 2019

(65) Prior Publication Data

US 2019/0392425 A1   Dec. 26, 2019

Related U.S. Application Data

(63) Continuation of application No. 16/014,403, filed on Jun. 21, 2018, now Pat. No. 10,410,207.

(51) Int. Cl.
*G06Q 20/34* (2012.01)
*G06Q 20/32* (2012.01)

(52) U.S. Cl.
CPC ....... *G06Q 20/351* (2013.01); *G06Q 20/3223* (2013.01); *G06Q 20/342* (2013.01); *G06Q 20/356* (2013.01)

(58) Field of Classification Search
CPC ...... G06Q 20/10; G06Q 20/40; G06Q 20/385; G06Q 20/00; G06Q 20/342; G06Q 20/356;
(Continued)

(56) References Cited

U.S. PATENT DOCUMENTS 6,636,833 B1   10/2003   Flitcroft et al.
8,244,851 B1   8/2012   Postoaca
(Continued)

FOREIGN PATENT DOCUMENTS

EP     2829036 A1   1/2015
WO   2014120051 A1   8/2014

OTHER PUBLICATIONS

Arpit Gupta, Method and System for Automatically . . . User Defined Policies, IP.com Prior Art Database Technical Disclosure, 2010. (Year: 2010).*

(Continued)

*Primary Examiner* — Namrata Boveja
*Assistant Examiner* — Carol A See
(74) *Attorney, Agent, or Firm* — Troutman Sanders LLP; Christopher J. Forstner; John A. Morrissett

(57) ABSTRACT

A method for providing a gift includes receiving gift information comprising data indicative of a gift type, a maximum gift amount, a gift recipient, and a first financial account from a first computing device associated with a gifter and via a software application. The first financial account being associated with the gifter and the gift recipient having preregistered user account with the software application. The method includes identifying one or more recipient financial accounts associated with the gift recipient including at least a second financial account. The method includes identifying a gift-eligible transaction that is associated with the second financial account by monitoring transaction data
(Continued)

associated with the one or more recipient financial accounts. The method includes transmitting a gift notification to a second computing device and outputting an instruction to initiate a transfer of a gift amount from the first financial account to the second financial account.

20 Claims, 8 Drawing Sheets

(58) Field of Classification Search
CPC ... G06Q 20/3223; G06Q 10/101; G06Q 10/04
See application file for complete search history.

(56) References Cited

U.S. PATENT DOCUMENTS

| | | | |
|---|---|---|---|
| 8,577,356 | B2 | 11/2013 | Kornilovsky et al. |
| 8,850,603 | B2 | 9/2014 | Methenitis |
| 8,904,479 | B1 | 12/2014 | Johansson et al. |
| 9,015,066 | B2 | 4/2015 | Scipioni et al. |
| 9,460,433 | B2 | 10/2016 | Proctor, Jr. et al. |
| 9,483,786 | B2 | 11/2016 | Glass et al. |
| 9,628,950 | B1 | 4/2017 | Noeth et al. |
| 2001/0034720 | A1* | 10/2001 | Armes ............... G06Q 20/105 705/65 |
| 2005/0197919 | A1 | 9/2005 | Robertson |
| 2007/0015490 | A1 | 1/2007 | Munje et al. |
| 2007/0050183 | A1 | 3/2007 | Kao et al. |
| 2008/0024272 | A1 | 1/2008 | Fiske |
| 2011/0251962 | A1 | 10/2011 | Hruska |
| 2012/0150743 | A1* | 6/2012 | Isaacson ............... G06Q 10/101 705/44 |
| 2013/0144732 | A1 | 6/2013 | Rothschild |
| 2013/0254036 | A1 | 9/2013 | Trinh et al. |
| 2013/0297511 | A1 | 11/2013 | Monk |
| 2014/0081761 | A1 | 3/2014 | Singonahalli et al. |
| 2014/0214661 | A1 | 7/2014 | Yankovich et al. |
| 2016/0042434 | A1 | 2/2016 | Levitt et al. |
| 2017/0161781 | A1 | 6/2017 | Parekh |
| 2017/0316405 | A1 | 11/2017 | Lonni et al. |

OTHER PUBLICATIONS

Tamara Holmes, "What merchant category codes are, how they are used," 2011, https://www.creditcards.com/credit-card-news/how-mcc-codes-are-used-credit-card-issuers. (Year: 2011).

* cited by examiner

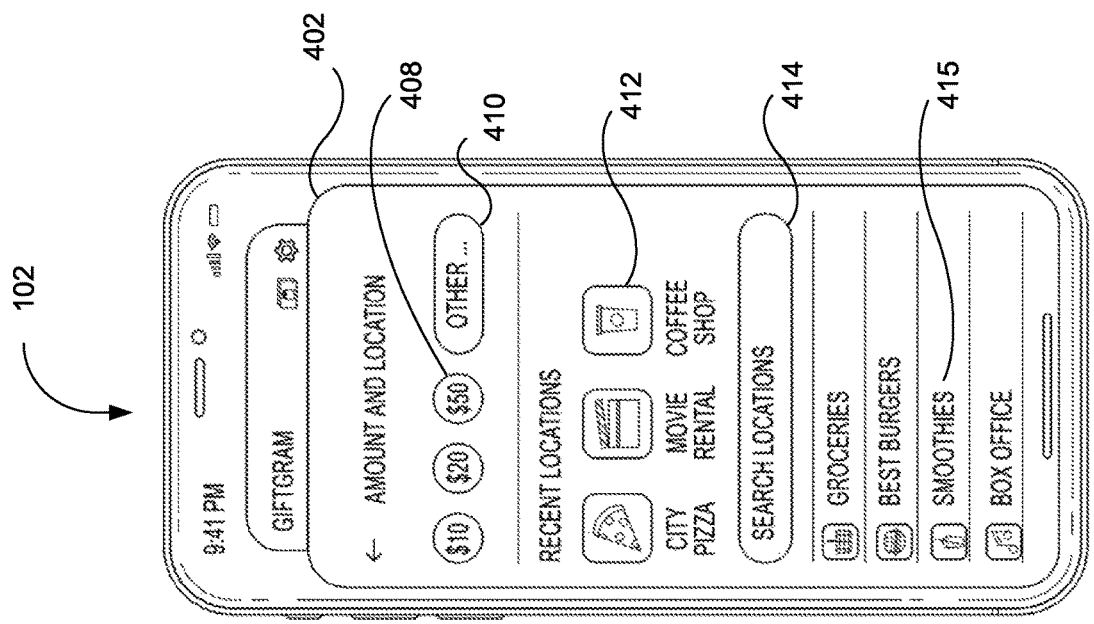
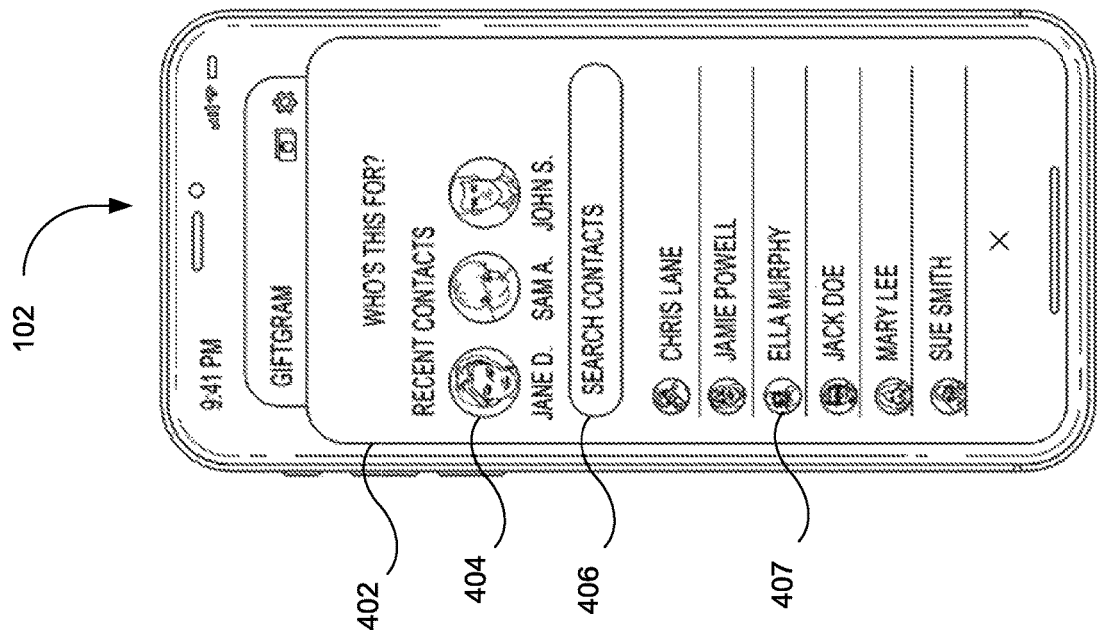
FIG. 4A
FIG. 4B

SYSTEMS FOR PROVIDING AND PROCESSING SURPRISE CONDITIONAL GIFTS

CROSS REFERENCE TO RELATED APPLICATIONS

This application is a continuation of, and claims priority under 35 U.S.C. § 120 to, U.S. patent application Ser. No. 16/014,403, filed Jun. 21, 2018, the entire contents of which is incorporated herein by reference in its entirety.

FIELD OF INVENTION

The present disclosure relates to systems and methods for providing a gift, and more particularly providing systems and methods for allowing a gifter to provide a financial gift by initiating funds transfer to a financial account of a gift recipient upon detecting a gift-eligible transaction made by the gift recipient.

BACKGROUND

Gift cards are a convenient means for people to provide a financial gift to one another that can be more personalized or allotted for a particular use than exchanging cash. To obtain a gift card, a purchaser typically pays an amount matching the desired value of the gift card (plus any gift card fees), receives the physical gift card, and provides it to the recipient for future use with one or more associated merchants that accept the card or for general use (similar to a credit card) depending on the type of gift card. While convenient, conventional gift cards often come with significant drawbacks. For example, conventional gift cards require that the purchaser spend the money to obtain the card before the money can be used by the recipient. Additionally, if the recipient only spends a portion of the value of the gift card or loses possession of the gift card, the recipient will not receive the full value that the gifter paid for the gift card, unnecessarily wasting some of the gifter's money. Furthermore, because conventional gift cards are either tied to specific merchants or available for general use (similar to a credit card), a gifter who wishes to give a customized gift for redemption from a particular merchant may find it unduly burdensome to hunt down a conventional gift card associated with that merchant, or may find that gift cards for the desired merchant do not exist. Further still, before being redeemed, a conventional gift card must be transferred to the possession of the recipient so that the recipient may decide when and where to redeem the gift card, which prevents a gifter from including an element of surprise in association with a particular purchase.

Accordingly, there is a need for improved systems that may allow a gifter to provide a financial gift having customizable redemption conditions that are enforced by the system and do not require that the gifter spend money on the gift before the recipient redeems the gift. Embodiments of the present disclosure are directed to this and other considerations.

SUMMARY

Disclosed embodiments provide systems and methods for providing a gift. In some embodiments the gift may be a financial gift that may be provided electronically.

Consistent with the disclosed embodiments, a method of providing a gift may include receiving, from a first computing device associated with a gifter via a software application, gift information comprising data indicative of a gift type, a maximum gift amount, a gift recipient, and a first financial account, wherein the first financial account is associated with the gifter and the gift recipient has a preregistered user account with the software application. The method may include identifying one or more recipient financial accounts associated with the gift recipient including at least a second financial account. The method may include identifying, based on monitoring of transaction data associated with the one or more recipient financial accounts, a gift-eligible transaction that is associated with the second financial account. The method may include transmitting a gift notification to a second computing device, the second computing device being associated with the gift recipient. The method may further include outputting an instruction to initiate a transfer of a gift amount from the first financial account to the second financial account.

Consistent with the disclosed embodiments, systems and non-transitory computer-readable mediums for providing a gift are also disclosed.

Further features of the disclosed design, and the advantages offered thereby, are explained in greater detail hereinafter with reference to specific embodiments illustrated in the accompanying drawings, wherein like elements are indicated be like reference designators.

BRIEF DESCRIPTION OF THE DRAWINGS

Reference will now be made to the accompanying drawings, which are not necessarily drawn to scale, and which are incorporated into and constitute a portion of this disclosure, illustrate various implementations and aspects of the disclosed technology and, together with the description, serve to explain the principles of the disclosed technology. In the drawings:

FIGS. 4A-B are exemplary embodiments of user interfaces of a software application for providing gifts;

DETAILED DESCRIPTION

Figure 1:
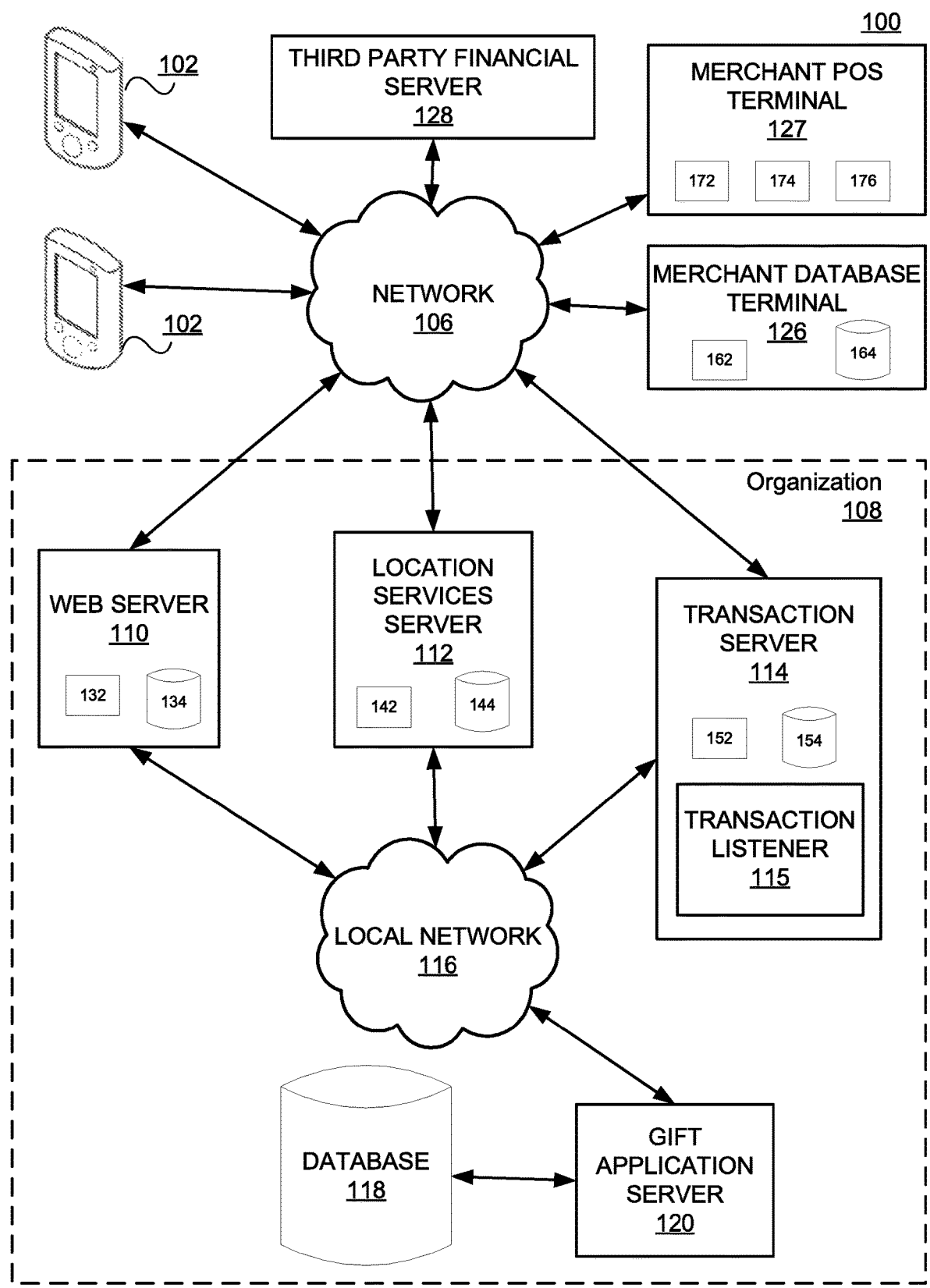
FIG. 1 is a diagram of an exemplary system that may be used to provide a financial gift.

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods.

Such other components not described herein may include, but are not limited to, for example, components developed after development of the disclosed technology.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

The disclosed embodiments are directed to methods for providing a gift. In one embodiment, a method may include receiving, from a first computing device associated with a gifter via a software application, gift information comprising data indicative of a gift type, a maximum gift amount, a gift recipient, and a first financial account, wherein the first financial account is associated with the gifter and the gift recipient has a preregistered user account with the software application. The method may include identifying one or more recipient financial accounts associated with the gift recipient including at least a second financial account. The method may include identifying, based on monitoring of transaction data associated with the one or more recipient financial accounts, a gift-eligible transaction that is associated with the second financial account. The method may include transmitting a gift notification to a second computing device, the second computing device being associated with the gift recipient. The method may further include outputting an instruction to initiate a transfer of a gift amount from the first financial account to the second financial account.

In another embodiment, a method for providing a gift is disclosed. The method may include receiving a gift issuance notification associated with a gifter, the gift issuance notification comprising data indicative of a gift recipient and gift limitations. The gift limitations may include a maximum gift amount and a gift type. The method may include determining one or more redemption merchants based on the gift type. The method may include monitoring a plurality of transaction authorization requests, wherein each of the plurality of transaction authorization requests comprises an attempted transaction account number representative of a financial account used to make an attempted transaction associated with the transaction authorization request, an attempted transaction date, an attempted transaction amount and a merchant code. The method may include detecting, from among the plurality of transaction authorization requests, a gift transaction authorization request, wherein the attempted transaction account number associated with the gift transaction authorization request corresponds to a financial account associated with the gift recipient. The method may include determining an identification of a merchant associated with the gift transaction authorization request based on the merchant code associated with the gift transaction authorization request. The method may include determining that the identity of the merchant associated with the gift transaction authorization request matches one of the one or more redemption merchants. The method may further include outputting an instruction to transfer a gift amount from a financial account associated with the gifter to the financial account associated with the recipient.

In another embodiment, a method for providing a gift is disclosed. The method may include receiving, from a first computing device associated with a gifter and via a software application, gift information comprising data indicative of a gift type, a maximum gift amount, a gift recipient, and a first financial account, wherein the first financial account may be an account of the gifter and the first financial account is associated with a financial institution. The method includes identifying one or more financial accounts associated with the gift recipient including at least a second financial account, wherein the second financial account is associated with the financial institution. The method includes identifying, based on monitoring of transaction data associated with the one or more financial accounts associated with the gift recipient, a gift-eligible transaction that is associated with the second financial account. The method includes transmitting a gift notification to a second computing device. The second computing device may be associated with the gift recipient. The method further includes outputting an instruction to initiate a transfer for a gift amount from the first financial account to the second financial account.

In another embodiment, a system may include one or more memory devices storing instructions, and one or more processors configured to execute the instructions to perform steps of a method of providing a gift as disclosed herein.

In another embodiment, a non-transitory computer-readable medium is disclosed. The non-transitory computer-readable medium may store instructions that, when executed by one or more processors, cause a system to execute a method of providing a gift as disclosed herein.

Reference will now be made in detail to exemplary embodiments of the disclosed technology, examples of which are illustrated in the accompanying drawings and disclosed herein. Wherever convenient, the same references numbers will be used throughout the drawings to refer to the same or like parts.

FIG. 1 is a diagram of an exemplary system 100 that may be configured to perform one or more processes that may allow a first person associated with a first computing device to create and provide a customized gift to a second person that may or may not be associated with a second computing device. System 100 may be configured to allow the first person (who may be referred to as the "gifter") to generate a financial gift for redemption by the second person (who may be referred to as the "gift recipient") without making any payment for the gift until the gift is redeemed by the second person. System 100 may be configured to allow the gifter to specify one or more gift limitations or conditions that may constrain the use of the gift, such as for example, a maximum gift amount that the redemption of the gift may not exceed, one or more redemption merchants (e.g., particular stores or vendors) or types of redemption merchants (e.g., restaurants, movie theaters, etc.) at which the gift is authorized to be redeemed, an expiration date by which the gift must be used before it expires, a condition that specifies use of the in association with card not present or card present transactions (i.e. whether or not the a payment card is present for the transaction), conditions on the number of uses of the gift (e.g., one-time use or multiple uses) or any other such types of conditions or limitations that may be created or enforced based on transaction authorization data or via administration of the gift mobile application. According to some embodiments, following the creation of the gift by the gifter, system 100 may monitor transaction authorization request data to detect and determine that the gift recipient has made a gift-eligible transaction, and then system 100 may cause the gift to be redeemed by transferring funds corresponding to the gift purchase amount from an account of the gifter to an account of the gift recipient. Because the redemption of the gift may be triggered based on a purchase made by the gift recipient using an account associated with the gift recipient (e.g., a credit card account associated with the gift recipient), system 100 does not require that the gift recipient be notified of the gift prior to redemption of the gift. Accordingly, system 100 may allow the gifter to surprise the gift recipient with the gift, such that the gift recipient may find out about the existence of the gift following the gift-eligible transaction. For example, if a gifter creates a gift for the gift recipient that is a $20 gift card to a particular coffee shop, the system may monitor purchases made at the specified coffee shop to determine when the gift recipient makes a purchase, and following such a determination, system 100 may redeem the gift by automatically initiating a transfer of funds for a gift amount from a financial account associated with the gifter to a financial account associated with the gift recipient. According to some embodiments, following the redemption of the gift, system 100 may provide the gift recipient and/or the gifter with a notification indicating that the gift has been redeemed. According to some embodiments, and for example, based on a preference input into system 100 by the gifter, system 100 may provide the gift recipient with a notification of the existence of the gift at the time the gift is created or at a date and time specified by the gifter so that the gift recipient may be aware of the existence of the gift prior to redeeming the gift.

The components and arrangements shown in FIG. 1 are not intended to limit the disclosed embodiments as the components used to implement the disclosed processes and features may vary. As shown, system 100 may include a pair of user devices 102, a network 106, a merchant database terminal 126, a merchant POS terminal 127, a third party financial server 128, and an organization 108 including, for example, a web server 110, a location services server 112, a transaction server 114, a local network 116, a database 118 and a gift application server 120.

In some embodiments, a gifter and gift recipient may operate separate user devices 102, respectively. In some embodiments, the gift recipient may not be associated with user device 102. User device 102 can include one or more of a mobile device, smart phone, general purpose computer, tablet computer, laptop computer, telephone, PSTN landline, smart wearable device, voice command device, other mobile computing device, or any other device capable of communicating with network 106 and ultimately communicating with one or more components of organization 108. According to some embodiments, user device 102 may communicate with a merchant database terminal 126, merchant POS terminal 127 and/or third party financial server 128 via network 106. In some embodiments, user device 102 may include or incorporate electronic communication devices for hearing or vision impaired users. In some embodiments, one or more user devices 102 may include software that is configured to allow a user to generate and send a financial gift to another user (which may be herein referred to as the "gift mobile application").

Network 106 may be of any suitable type, including individual connections via the internet such as cellular or WiFi networks. In some embodiments, network 106 may connect terminals, services, and mobile devices using direct connections such as radio-frequency identification (RFID), near-field communication (NFC), Bluetooth™, low-energy Bluetooth™ (BLE), WiFi™, ZigBee™, ambient backscatter communications (ABC) protocols, USB, WAN, or LAN. Because the information transmitted may be personal or confidential, security concerns may dictate one or more of these types of connections be encrypted or otherwise secured. In some embodiments, however, the information being transmitted may be less personal, and therefore the network connections may be selected for convenience over security.

Network 106 may comprise any type of computer networking arrangement used to exchange data. For example, network 106 may be the Internet, a private data network, virtual private network using a public network, and/or other suitable connection(s) that enables components in system environment 100 to send and receive information between the components of system 100. Network 106 may also include a public switched telephone network ("PSTN") and/or a wireless network.

Organization 108 may be associated with an entity such as a business, corporation, individual, partnership, or any other entity that provides one or more of goods, services, and consultations to individuals such as customers. For example, in some embodiments, organization 108 may be associated with a financial services provider.

Organization 108 may include one or more servers, devices, and computer systems for performing one or more functions associated with products and/or services that organization 108 provides. Such servers, devices, and computer systems may include, for example, web server 110, location services server 112, transaction server 114, database 118 and gift application server 120, as well as any other computer systems necessary to accomplish tasks associated with organization 108 or the needs of customers (which may be customers of the entity associated with organization 108).

Web server 110 may include a computer system configured to generate and provide one or more websites accessible to customers, as well as any other individuals involved in organization 108's normal operations. Web server 110 may include a computer system configured to receive communications from user device 102 via for example, a mobile application, a chat program, an instant messaging program, a voice-to-text program, an SMS message, email, or any other type or format of written or electronic communication. Web server 110 may have one or more processors 132 and one or more web server databases 134, which may be any suitable repository of website data. Information stored in web server 110 may be accessed (e.g., retrieved, updated, and added to) via local network 116 and/or network 106 by one or more devices of system 100. According to some embodiments, web server 110 may host websites, data or software applications that user device 102 may access and interact with. For example, web server 110 may provide a website, web portal or software application that allows a user of user device 102 to access or view account information associated with one or more financial accounts of the user. In some embodiments, web server 110 may receive and forward communications or portions of communications between user device 102 and components of system 100, such as location services server 112, transaction server 114, database 118 and/or gift application server 120. According to some embodiments, web server 110 may be configured to transmit data and/or messages from a first user device 102 to a second user device 102, via for example, a mobile application that has been downloaded on one or both user devices 102.

Location services server 112 may include a computer system configured to track the location of user device 102 based on information and data received from user device 102. For example, location services server 112 may receive location data from user device 102, such as global positioning satellite (GPS) data comprising the coordinates of the device, RFID data of associated with known objects and/or locations, or network data such as the identification, location, and/or signal strength of a wireless base station (e.g., Wi-Fi router, cell tower, etc.) connected to user device 102 that may be used to determine the location of user device 102. According to some embodiments, location services server 112 may store geofencing information that represents a designed location or area. As those of skill in the art will appreciate, a geofence may be a virtual geographic boundary that when crossed by user device 102, may trigger system 100 to execute one or more actions. According to some embodiments, the contours of a geofence may be predetermined, for example, location services server 112 may receive one or more predetermined geofences that are associated with respective locations from a third party. For example, location services server 112 may receive data representative of a geofence around a particular store from an organization associated with the store that determined the location of the geofence. In some embodiments, the contours of a geofence may be determined by receiving (e.g., from a user of system 100) the location of a point (e.g., longitude and latitude) and a radius and setting the contours of the geofence to be equal to the location of a circle draw around the point at the specified radius. In some embodiments, a geofence may be specified by a user of system 100 by, for example, drawing the geofencing onto a virtual map or otherwise inputting the location of the geofence.

Location services server 112 may have one or more processors 142 and one or more location services databases 144, which may be any suitable repository of location data. Information stored in location services server 112 may be accessed (e.g., retrieved, updated, and added to) via local network 116 and/or network 106 by one or more devices of system 100. In some embodiments, location services server processor 142 may be used to determine the location of user device 102, whether user device 102 has crossed a particular geofence or whether user device 102 is inside or outside of an area designated by a particular geofence. In some embodiments, location services server 112 may be configured send messages and/or data to other devices, such as for example, user device 102 or gift application server 120, upon determining that user device 102 has crossed a specified geofence or entered an area encompassed by a specified geofence. For example, in some embodiments, location services server 112 may send user device 102 a notification that the user of user device 102 has received a gift, and may provide, for example, the details of the gift. According to some embodiments, location services server 112 may receive data representative of a location that is associated with a gift. For example, gift application server 120 may provide data to location services server 112 representative of a location of a particular store that is associated with a particular gift. Location services server 112 may generate, receive or access geofence information associated with the received location and may monitor location data associated with the user device 102 of a designated gift recipient to determine when the user device 102 has entered the location. Location services server 112 may determine that user device has entered the location by determining that, for example, user device has crossed over the geofence associated with the gift. In this way, location services server 112 may determine when a gift recipient has entered a location or proximity to a redemption merchant specified by the gifter.

Transaction server 114 may include a computer system configured to process one or more transactions involving a financial account associated with a customer. For example, a transaction may be a purchase of goods or services from a merchant that is made in association with a financial account, such as a bank account or a credit card account. Transactions may be made at merchant POS terminal 127 by for example, swiping a credit card or making a payment using financial account information stored on a smartphone in a digital wallet. Such transactions may be made at merchant locations or at a merchant website via the internet. Transactions may be made using for example, a credit card, a debit card, a gift card, or other ways of conveying financial account numbers and/or account credentials that are known in the art. Transaction server 114 may have one or more processors 152 and one or more transaction server databases 154, which may be any suitable repository of transaction data. Information stored in transaction server 114 may be accessed (e.g., retrieved, updated, and added to) via local network 116 and/or network 106 by one or more devices of system 100. As described in more detail below, transaction server 114 may store specified account numbers that may be associated with financial accounts of the gifter and/or gift recipient, and which may be the subject of transaction monitoring by transaction server 114. Transaction server 114 may also store associated rules, conditions, limitations or restrictions that may be applied to an attempted transaction made using an account associated with the gift recipient to determine whether to classify the attempted transaction as a gift-eligible transaction. For example, such gift limitations may include that a transaction may only be made at a certain identified merchant or merchants, a certain type of merchant, a certain location, for transactions up to a certain aggregate or maximum gift amount, on, before or after a specified date and/or time, or other such restrictions that may be specified by a gifter in association with the gift. Thus, a gift-eligible transaction may be a transaction or attempted transaction that is made using an account associated with the gift recipient that satisfies the gift limitations associated with a corresponding gift to the gift recipient. In some embodiments, upon identifying a gift-eligible transaction, transaction server 114 may trigger the redemption of an associated gift.

According to some embodiments, transaction server 114 may be configured to receive information associated with financial accounts that are used for attempted transactions at merchants. As will be appreciated by those of skill in the art, when a financial account, such as credit card account or debit card account, is used to make a purchase at a merchant, the merchant POS system may generate a transaction authorization request that is transmitted to a processing system to determine whether the attempted purchase should be authorized. Thus, according to some embodiments, upon swiping a credit or debit card at merchant POS terminal/device or entering a financial account number (e.g., a credit card number) into a website to make an online purchase, transaction server 114 may receive transaction authorization data representative of the attempted transaction. According to some embodiments, transaction data may also be monitored and obtained from third party account aggregating services, such as websites or applications that collect information about multiple user accounts in one place. Such transaction authorization data may include an account number associated with a card or financial account used to make the attempted purchase, and may include other information related to the transaction or merchant, such as the amount of the attempted transaction, the date and time of the attempted transaction, and a merchant category code (which may be referred to herein as a "merchant code") associated with the merchant at which the transaction was attempted. According to some embodiments, transaction server 114 may receive transaction authorization requests comprising transaction authorization data and may make a determination as to whether or not the transaction should be authorized. In some embodiments, transaction server 114 may also determine whether an attempted purchase associated with a financial account of a gift recipient may be classified as a gift-eligible transaction.

According to some embodiments, transaction server 114 may store information sufficient to identify one or more financial accounts of the gifter and/or the gift recipient, such as account number, credit/debit card information, and the like. In some embodiments, transaction server 114 may monitor transaction authorization requests received from, for example, one or more merchant POS devices, to identify one or more attempted transactions that have been made in association with a financial account of the gift recipient. For example, if Tom uses system 100 to create a gift for Jerry, transaction server 114 may monitor transaction authorization requests to identify any attempted transactions made using a known financial account (e.g., a credit card) that is associated with Jerry. In some embodiments, after identifying an attempted transaction made in association with a financial account of the gift recipient, transaction server 114 may then apply one or more rules, conditions, restrictions or gift limitations associated with a gift made to the gift recipient to determine if the identified transaction is gift-eligible. For example, if Tom uses system 100 to create a gift for Jerry that is a $20 gift for use at a particular coffee shop before a specified expiration date, then upon identifying an attempted purchase made by a credit card associated with Jerry, transaction server 114 may determine if the attempted transaction was made at the specified coffee shop and before the specified expiration date to determine whether the attempted transaction is a gift-eligible transaction. According to some embodiments, if transaction server 114 determines that the attempted transaction is a gift-eligible transaction, transaction server 114 may generate and output an instruction to initiate a transfer (e.g., via an ACH transfer, an account transfer between accounts at the same financial institution, rewards points of bill payment made to recipient's credit card account or the like) of a gift amount from a financial account of the gifter to a financial account of the gift recipient that corresponds to the gift amount (or remaining balance associated with the gift if a prior portion of the gift has already been redeemed). According to some embodiments, if the funds are being transferred between two accounts that are both associated with an entity associated with organization 108, such transfers may occur instantaneously or substantially instantaneously. According to some embodiments, if one or more of the accounts involved in the transfer is not associated with an entity associated with organization 108, then transaction server may communicate with third party financial server 128 to carry out the transfer and there may be a delay of, for example, one or two business days in transferring the funds. According to some embodiments, if transaction server 114 determines that an attempted transaction made by an account associated with the gift recipient does not satisfy the specified conditions of the gift, then transaction server 114 may determine that the attempted transaction does not qualify as a gift-eligible transaction and may take no action with respect to the gift.

According to some embodiments, system 100 may maintain a record of a gift balance. In some embodiments, in response initiating a transfer of a gift amount from a financial account of the gifter to a financial account of the gift recipient, transaction server 114 may store a record of the transaction and update a gift balance. For example, if an initial gift of $50 was created for the gift recipient and the gift recipient makes a gift-eligible purchase of $20, system 100 (e.g., gift application server 120) may change the gift balance from $50 to $30. According to some embodiments, if the purchase amount associated with a gift-eligible transaction exceeds the current balance of an associated gift, then system 100 may cap the gift amount transferred from the gifter's account to the gift recipient's account at the remaining balance of the gift.

According to some embodiments, transaction server 114 may be configured to determine the identity of a merchant associated with an attempted transaction based on the merchant category code included in the transaction authorization data and/or other transaction authorization data such as the zip code and country code. For example, in some embodiments, transaction server 114 may be configured to determine the identity of a business at which a purchase is made, such as a particular chain of fast food restaurants, based on the merchant category code. According to some embodiments, transaction server 114 may determine information about the merchant associated with a transaction such as the merchant's name, type/category of merchant, location, address and the like, by utilizing third party data and/or machine learning techniques to derive such information. According to some embodiments, transaction server 114 may be configured to determine one or more of a merchant description, a merchant name, a merchant location/address/zip code/country code based on a transaction ID associated with the transaction. In some embodiments, transaction server 114 may be configured to determine the location or address of the attempted purchase based on the merchant category code or other data provided with a transaction authorization request. According to some embodiments, if the identity of the merchant may not be determined solely based on the merchant category code, it may be determined based on the merchant category code in conjunction with the location information derived from the transaction authorization request. In some embodiments, transaction server 114 may be configured to determine the type of business at which the attempted transaction is made based on the merchant category code, such as a whether the merchant is a restaurant, gas station, book store, movie theater or the like. In some embodiments, transaction server 114 may cleanse the raw transaction data and output transaction data that human readable. For example, transaction server 114 may receive transaction authorization data associated with a transaction that has a transaction ID of NCPI567 and may cleanse the transaction to output that the transaction took place at a restaurant called "Burger Joint" that is located at 123 Main Street. By using transaction authorization request data to identify the merchant at which a gift is used, system 100 may allow a gifter to create a customized gift to a wide variety of merchants without requiring the merchant to be registered with the system, thereby allowing a user to create a customized gift to a merchant at which gifts may not otherwise be available for purchase.

According to some embodiments, transaction server 114 may include a transaction listener 115 that may be configured to monitor transaction authorization data that originates from, for example, one or more merchant POS terminals or devices. According to some embodiments, transaction listener 115 may monitor incoming transaction authorization requests to identify attempted transactions that are associated with a financial account of the gift recipient that is associated with a gift. For example, for each attempted transaction, transaction listener 115 may compare an account number (e.g., a credit card number) associated with the attempted transaction with one or more stored account numbers associated with the gift recipient to identify all attempted transactions that are made by the gift recipient, based on known accounts of the gift recipient. For example, transaction listener 115 may identify one or more attempted transactions associated with a particular credit card account by monitoring transaction authorization request data to identify attempted transactions that were made in association with attempted payment made using a credit card number that matches a stored account number associated with the gift recipient. According to some embodiments, transaction listener 115 may receive transaction authorization requests in real time if, for example, a financial account associated with the attempted payment method is part of a network associated with organization 108. In some embodiments, transaction listener 115 may receive a batch of transaction authorization requests at a particular time, such as at the end of the day, if, for example, the financial account associated with the attempted payment method is not part of a network associated with organization 108. Accordingly, in some embodiments, transaction listener 115 may monitor transaction authorization data in real time (or, in very close temporal proximity to when each attempted transaction is made), and in some embodiments transaction listener 115 may monitor transaction authorization data in batches at specified intervals, or some combination of both. In this way, transaction server 114 may be configured to monitor and identify gift-eligible transactions in real time and/or intermittently at intervals.

Local network 116 may comprise any type of computer networking arrangement used to exchange data in a localized area, such as WiFi, Bluetooth™ Ethernet, and other suitable network connections that enable components of organization 108 to interact with one another and to connect to network 106 for interacting with components in system environment 100. In some embodiments, local network 116 may comprise an interface for communicating with or linking to network 106. In other embodiments, components of organization 108 may communicate via network 106, without a separate local network 116.

According to some embodiments, database 118 may be a database associated with organization 108 and/or its related entity that may store a variety of information relating to customers, transactions, customer information, and business operations. Database 118 may also serve as a back-up storage device and may contain data and information that is also stored on, for example, local databases associated with web server 110, location services server 112, transaction server 114, or gift application server 120. Database 118 may be accessed by other devices and may be used to store records of every interaction, communication, and/or transaction a particular customer has had with organization 108 and/or its related entity. According to some embodiments, database 118 may store data associated with current or past gifts sent or received by users of system 100, such as for example, data identifying a sender of a gift, a receiver of a gift, an amount of a gift, an account designated to pay for the gift or to receive a reimbursement for the gift, the stores and/or types of stores that the gift is authorized to be redeemed at, electronic lock information associated with a gift, an expiration and/or an authorized usage date of a gift, and any other such information that may be pertinent to the provision of a gift.

Gift application server 120 may include a computer system configured to facilitate the creation, purchase, and provision of a gift by a first user device 102 to a gift recipient that may be associated with one or more gift recipient financial accounts by automatically reimbursing the gift recipient for a gift-eligible transaction. According to some embodiments, gift application server 120 may generate an electronic gift associated with a financial account of the gifter (which may be referred to as a "gift account") in response to receiving gift information specified by the gifter via, for example, a software application running on user device 102. According to some embodiments, gift application server 120 may generate an electronic gift based on the gift information by, for example, creating and executing instructions to monitor transaction authorization data to identify gift-eligible transactions as described above and by initiating one or more gift redemptions in response to identifying one or more gift-eligible transactions. In other words, in some embodiments, gift application server 120 may be configured to generate a gift from a gifter to a gift recipient in accordance with conditions specified by the gifter (e.g., when, where and for how much the gift may be used) and upon identifying a transaction made by the gift recipient that satisfies the specified conditions based on monitoring of transaction authorization request data, gift application server 120 may automatically reimburse the gift recipient for the gift-eligible transaction from a financial account of the gifter.

In some embodiments, the gifter may specify and customize the gift information via, for example, a software application installed on user device 102. In some embodiments, gift information may specify features of the gift, such as one or more of a gift amount that represents the maximum amount that will be transferred from the gifter to the gift recipient in association with the gift, a gift account associated with the gifter from which the gift funds may be drawn, a selection of a gift recipient that represents the individual that is to receive the gift, one or more financial accounts associated with the gift recipient that may used to identify transactions made by the gift recipient, and one or more gift limitations that may be applied to such identified transactions to determine whether a given transaction is a gift-eligible transaction. According to some embodiments, the selection of a gift recipient may include any information that is sufficient to identify an individual, such as a name, a username, a handle, a phone number, an address, an email address, an image, or the like. According to some embodiments, gift limitations may be restrictions on use of the gift that are specified by the gifter, such as a maximum gift amount, one or more redemption merchants (e.g., a particular business or chain of stores) at which the gift may be redeemed, one or more gift types categories that correspond to a class of redemption merchants (e.g., restaurants, movie theaters, etc.) at which the gift may be used, one or more geographic locations at which the gift may be used, date and time restrictions on use, and the like.

As describe above, system 100 may monitor attempted transaction authorization data to identify gift-eligible transactions that are associated with one or more financial accounts of the gift recipient. In some embodiments, based on the gift information, gift application server 120 may receive or identify one or more financial accounts associated with the gift recipient for use in transaction monitoring. In some embodiments, gift application server 120 may identify such financial accounts by looking up one or more account numbers corresponding to known credit, debit and gift cards associated with the selected gift recipient. For example, if the gift recipient has financial accounts that are associated with an entity (e.g., a financial services provider) that is associated with organization 108, then system 100 may have access to the gift recipient's financial account records from which to determine financial account numbers of the gift recipients accounts. In some embodiments, system 100 may communicate with third party financial server 128 to obtain financial account information associated with the gift recipient if gift recipient has financial accounts with an entity other than an entity associated with organization 108. According to some embodiments, system 100 may store financial account information of the gift recipient in response to the gift recipient submitting financial account information to system 100 via, for example, a software application on user device 102 associated with the gift recipient. For example, the gift recipient may have a user account with a mobile application that stores the gift recipient's credit card numbers. Thus, in some embodiments, the gift recipient may have a pre-registered user account with, for example, a software application that interfaces with gift application server 120, and the pre-registered user account may include financial account information sufficient to identify one or more financial accounts of the gift recipient.

According to some embodiments, gift application server 120 may cause system 100 to monitor transaction authorization request data to identify purchases made by the gift recipient by, for example, instructing transaction listener 115 to monitor the transaction authorization data to identify authorization requests that correspond to the known financial accounts of the gift recipient. Gift application server 120 may further cause system 100 to determine if such identified authorization requests are associated with transactions that qualify as gift-eligible transactions by determining whether the transaction satisfies the conditions of the gift. For example, system 100 may determine whether the transaction was made at a merchant that corresponds to a redemption merchant and/or a gift type category specified by the gift. In some embodiments, system 100 may determine whether the transaction was made at a geographic location or time frame specified by the gift. Upon determining that a gift-eligible transaction has occurred, gift application server 120 may cause system 100 to initiate a transfer of a gift amount corresponding to the purchase (but not to exceed a maximum specified gift amount) from a financial account of the gifter to a financial account of the gift recipient. Gift application server 120 may further cause system 100 to send a notification to user devices 102 associated with the gifter and/or gift recipient to provide a notification of the gift.

Merchant database terminal 126 may have one or more processors 162 and one or more merchant databases 164, which may be any suitable repository of merchant data. Merchant database terminal 126 may be located at the POS location, off-site at another merchant location, or at a third-party location. Information stored in merchant database terminal 126 may be accessed (e.g., retrieved, updated, and added to) via network 106 by one or more devices (e.g., service provider terminal 110) of system 100. In other embodiments, merchant POS terminal 127 may be configured to process online transactions on behalf of the associated merchant. Merchant database 164 may store information relating to products and services offered by merchants such as pricing, quantity, availability, discounts, reviews, and any other such generally available information that a consumer may utilize in making a purchasing decision. In some embodiments, merchant database 164 may also include location information associated with products and services that identifies the location(s) that a particular product or service is available for purchase. In some embodiments, the location information may include an identification of a particular store, terminal, or kiosk that the product or service may be purchased from.

Merchant POS terminal 127 may have one or more POS devices 172, 174, 176 that communicate with one or more devices (e.g., user device 102) of system 100 via network 106. In some embodiments, POS devices 172, 174, 176 may devices that are configured to receive or obtain payment information from user device 102. For example, one or more POS devices 172 174, 176 may include a near-field communication interface, a Bluetooth communication interface, a WiFi communication interface, or any other such communication interface that may enable communication between merchant POS terminal 127 and user device 102. In some embodiments, one or more POS devices 172, 174, 176 may include a scanner for scanning images or data that convey payment information displayed by user device 102, an image capture device for capturing images displayed by user device 102, a card-reading device for obtaining payment information from a card (e.g., by reading a chip imbedded in the card or reading information from a magnetic strip), or a keypad for receiving a user input representative of payment information (e.g., a typed credit card number).

Third party financial server 128 may include a computer system configured to store information related financial accounts, such as checking accounts, savings accounts, credit cards accounts, and the like. For example, third party financial server 128 may store account numbers, PANs, balances, transaction data, fund transfer information, and user account information. According to some embodiments, a gifter and/or a gift recipient may have one or more financial accounts associated with third party financial server. In some embodiments, transaction server 114 and/or gift application server 120 may be configured to send instructions to third party financial server 128 via network 106 to cause third party financial server 128 to debit a financial account associated with third party financial server 128 or initiate a transfer of funds between financial accounts, such as an account of the gifter and an account of the gift recipient. Accordingly, in some embodiments, gift application server 120 may store login credentials of financial accounts associated with the gifter and/or gift recipient and transmit such credentials to third party financial server 128 as necessary to initiate such transactions.

Although the preceding description describes various functions of a web server 110, location services server 112, transaction server 114, database 118, gift application server 120, merchant database terminal 126, merchant POS terminal 127 and third party financial server 128, in some embodiments, some or all of these functions may be carried out by a single computing device. For example, some or all of the functions of web server 110, location services server 112, transaction server 114, database 118 and gift application server 120 may be carried out by a single device.

For ease of discussion, embodiments may be described in connection with use of a mobile application on a mobile device to create, customize, send and receive, and in particular, financial gifts that may be redeemed at specified merchants. It is to be understood, however, that disclosed embodiments are not limited to use of a mobile application on a mobile device, but also contemplates embodiments using desktop computers to create, send and/or receive electronic gifts as well as the printing of indicia of a received gift for redemption at a merchant by a printer associated with a computing device of the gift recipient. Further, steps or processes disclosed herein are not limited to being performed in the order described, but may be performed in any order, and some steps may be omitted, consistent with the disclosed embodiments.

The features and other aspects and principles of the disclosed embodiments may be implemented in various environments. Such environments and related applications may be specifically constructed for performing the various processes and operations of the disclosed embodiments or they may include a general-purpose computer or computing platform selectively activated or reconfigured by program code to provide the necessary functionality. Further, the processes disclosed herein may be implemented by a suitable combination of hardware, software, and/or firmware. For example, the disclosed embodiments may implement general purpose machines configured to execute software programs that perform processes consistent with the disclosed embodiments. Alternatively, the disclosed embodiments may implement a specialized apparatus or system configured to execute software programs that perform processes consistent with the disclosed embodiments. Furthermore, although some disclosed embodiments may be implemented by general purpose machines as computer processing instructions, all or a portion of the functionality of the disclosed embodiments may be implemented instead in dedicated electronics hardware.

The disclosed embodiments also relate to tangible and non-transitory computer readable media that include program instructions or program code that, when executed by one or more processors, perform one or more computer-implemented operations. The program instructions or program code may include specially designed and constructed instructions or code, and/or instructions and code well-known and available to those having ordinary skill in the computer software arts. For example, the disclosed embodiments may execute high level and/or low-level software instructions, such as machine code (e.g., such as that produced by a compiler) and/or high level code that can be executed by a processor using an interpreter.

Figure 2:
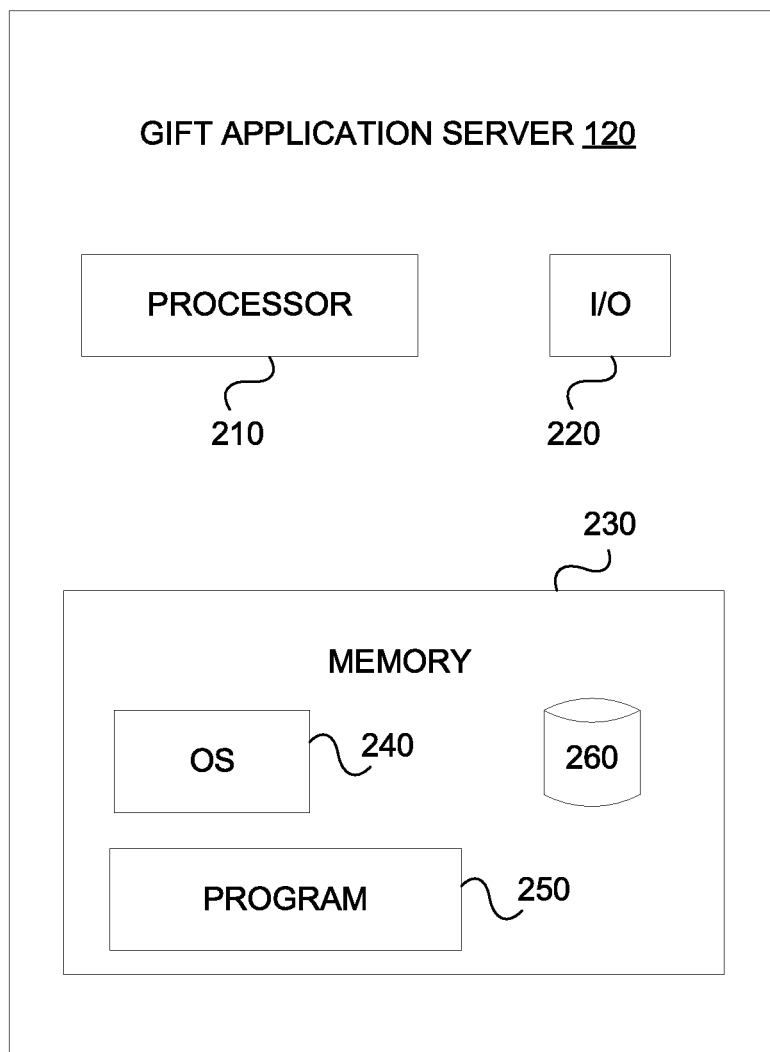
FIG. 2 is a component diagram of an exemplary gift application server.

An exemplary embodiment of gift application server 120 is shown in more detail in FIG. 2. Web server 110, location services server 112, transaction server 114, merchant database terminal 126, merchant POS terminal 127, third party financial server 128 and/or user device 102 may have a similar structure and may include many components that are similar to or even have the same capabilities as those described with respect to gift application server 120. As shown, gift application server 120 may include a processor 210, an input/output ("I/O") device 220, a memory 230 containing an operating system ("OS") 240 and a program 250. For example, gift application server 120 may be a single device or server or may be configured as a distributed computer system including multiple servers, devices, or computers that interoperate to perform one or more of the processes and functionalities associated with the disclosed embodiments. In some embodiments, gift application server 120 may further include a peripheral interface, a transceiver, a mobile network interface in communication with the processor 210, a bus configured to facilitate communication between the various components of gift application server 120, and a power source configured to power one or more components of gift application server 120.

A peripheral interface may include hardware, firmware and/or software that enables communication with various peripheral devices, such as media drives (e.g., magnetic disk, solid state, or optical disk drives), other processing devices, or any other input source used in connection with the instant techniques. In some embodiments, a peripheral interface may include a serial port, a parallel port, a general purpose input and output (GPIO) port, a game port, a universal serial bus (USB), a micro-USB port, a high definition multimedia (HDMI) port, a video port, an audio port, a Bluetooth™ port, a near-field communication (NFC) port, another like communication interface, or any combination thereof.

In some embodiments, a transceiver may be configured to communicate with compatible devices and ID tags when they are within a predetermined range. A transceiver may be compatible with one or more of: radio-frequency identification (RFID), near-field communication (NFC), Bluetooth™, low-energy Bluetooth™ (BLE), WiFi™, ZigBee™, ambient backscatter communications (ABC) protocols or similar technologies.

A mobile network interface may provide access to a cellular network, the Internet, a local area network, or another wide-area network. In some embodiments, a mobile network interface may include hardware, firmware, and/or software that allows the processor(s) 210 to communicate with other devices via wired or wireless networks, whether local or wide area, private or public, as known in the art. A power source may be configured to provide an appropriate alternating current (AC) or direct current (DC) to power components.

Processor 210 may include one or more of a microprocessor, microcontroller, digital signal processor, co-processor or the like or combinations thereof capable of executing stored instructions and operating upon stored data. Memory 230 may include, in some implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein are implemented as a combination of executable instructions and data within the memory 230.

Processor 210 may be one or more known processing devices, such as a microprocessor from the Pentium™ family manufactured by Intel™ or the Turion™ family manufactured by AMD™. Processor 210 may constitute a single core or multiple core processor that executes parallel processes simultaneously. For example, processor 210 may be a single core processor that is configured with virtual processing technologies. In certain embodiments, processor 210 may use logical processors to simultaneously execute and control multiple processes. Processor 210 may implement virtual machine technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

Gift application server 120 may include one or more storage devices configured to store information used by processor 210 (or other components) to perform certain functions related to the disclosed embodiments. In some embodiments, gift application server 120 may include memory 230 that includes instructions to enable processor 210 to execute one or more applications, such as server applications, network communication processes, and any other type of application or software known to be available on computer systems. Alternatively, the instructions, application programs, etc. may be stored in an external storage or available from a memory over a network. The one or more storage devices may be a volatile or non-volatile, magnetic, semiconductor, tape, optical, removable, non-removable, or other type of storage device or tangible computer-readable medium.

In some embodiments, gift application server 120 may include memory 230 that includes instructions that, when executed by processor 210, perform one or more processes consistent with the functionalities disclosed herein. Methods, systems, and articles of manufacture consistent with disclosed embodiments are not limited to separate programs or computers configured to perform dedicated tasks. For example, gift application server 120 may include memory 230 that may include one or more programs 250 to perform one or more functions of the disclosed embodiments. Moreover, processor 210 may execute one or more programs 250 located remotely from system 100. For example, system 100 may access one or more remote programs 250, that, when executed, perform functions related to disclosed embodiments. In some embodiments, gift application server 120 may include a program that when executed, processes a request from a gifter to provide a gift to a gift recipient and creates, provides and administers the gift as disclosed herein.

Memory 230 may include one or more memory devices that store data and instructions used to perform one or more features of the disclosed embodiments. Memory 230 may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational or non-relational databases. Memory 230 may include software components that, when executed by processor 210, perform one or more processes consistent with the disclosed embodiments. In some embodiments, memory 230 may include a database 260 for storing related data to enable gift application server 120 to perform one or more of the processes and functionalities associated with the disclosed embodiments.

Gift application server 120 may also be communicatively connected to one or more memory devices (e.g., databases) locally or through a network. The remote memory devices may be configured to store information and may be accessed and/or managed by CSR terminal 122. By way of example, the remote memory devices may be document management systems, Microsoft™ SQL database, SharePoint™ databases, Oracle™ databases, Sybase™ databases, or other relational or non-relational databases. Systems and methods consistent with disclosed embodiments, however, are not limited to separate databases.

Gift application server 120 may also include one or more I/O devices 220 that may comprise one or more interfaces for receiving signals or input from devices and providing signals or output to one or more devices that allow data to be received and/or transmitted by gift application server 120. For example, gift application server 120 may include interface components, which may provide interfaces to one or more input devices, such as one or more keyboards, mouse devices, touch screens, track pads, trackballs, scroll wheels, digital cameras, microphones, sensors, and the like, that enable gift application server 120 to receive data from one or more users. Gift application server 120 may include a display, a screen, a touchpad, or the like for displaying images, videos, data, or other information.

In exemplary embodiments of the disclosed technology, gift application server 120 may include any number of hardware and/or software applications that are executed to facilitate any of the operations. The one or more I/O interfaces may be utilized to receive or collect data and/or user instructions from a wide variety of input devices. Received data may be processed by one or more computer processors as desired in various implementations of the disclosed technology and/or stored in one or more memory devices.

Figure 3:
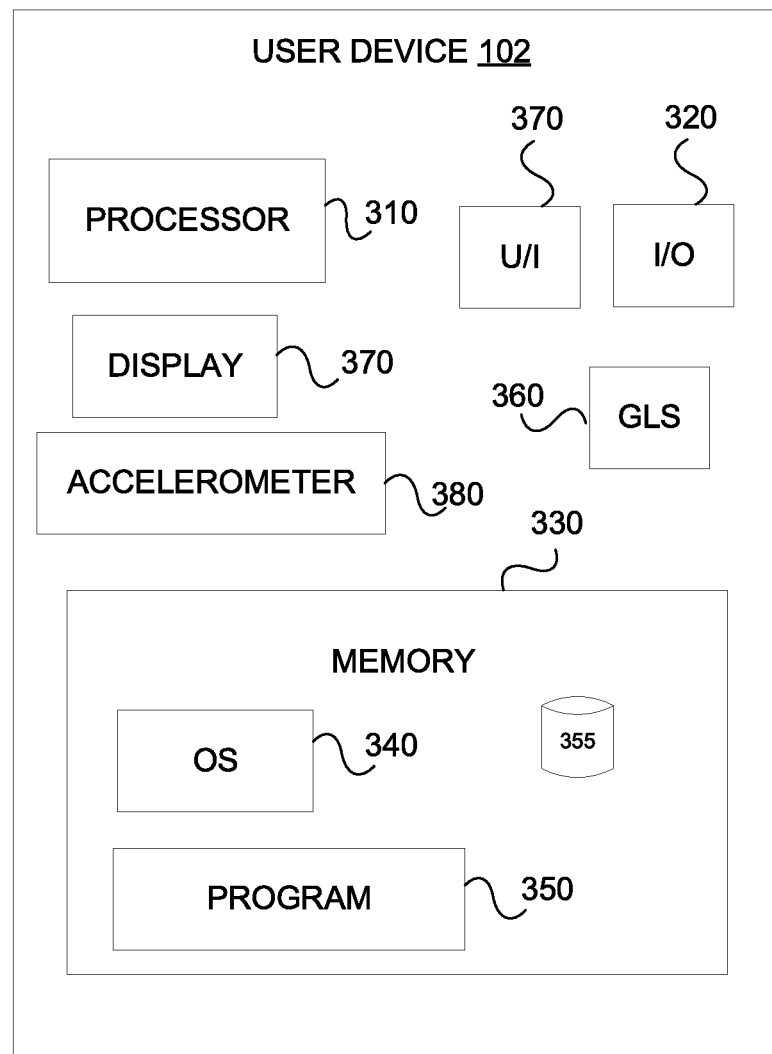
FIG. 3 is a component diagram of an exemplary user device.

FIG. 3 shows an example embodiment of user device 102. As shown, user device 102 may include a processor 310; an input/output ("I/O") device 320; a memory 330 containing an operating system ("OS") 340, a database 355, which may be any suitable repository of data, which may include a digital wallet for storing digital gifts and payment information, and/or a program 350; a geographic location sensor ("GLS") 360 for determining the geographic location of user device 102; a user interface ("U/I") device 370 for receiving user input data, such as data representative of a click, a scroll, a tap, a press, or typing on an input device that can detect tactile inputs; a gyroscope and/or an accelerometer 380 and/or any other sensor configured to detect motion of user device 102; and/or a display 390 for displaying digital images and/or video. As described in greater detail below, in some embodiments, program 350 may include a gift mobile application that may be a software application configured to run on user device 102. According to some embodiments, the gift mobile application may allow users to create, customize, send and receive electronic gifts as described further herein. In some embodiments, user input data may include biometric data associated with a user of user device 102 obtained by one or more sensors, such as a fingerprint scanner, a microphone, an image capture device, and the like. According to some embodiments, biometric data may be used to authenticate a user prior to creating, customizing, sending or utilizing an electronic gift. For example, in some embodiments, the gift mobile application may require a user to authenticate themselves using, for example, fingerprint data obtained from a fingerprint scanner of user device 102 prior to sending or using an electronic gift. It will be understood that other such authentication methods such as facial recognition, voice recognition, gesture recognition, username/password login, multi-factor authentication (e.g., sending a user an authentication code via an email or text message) and the like may also be used in a similar manner. In some embodiments, I/O device 320 may include a transceiver for sending and receiving wireless signals, such as Wi-Fi, cellular, Bluetooth, near-field communication, and any other such type of signal. In some embodiments, user device 102 may further include a peripheral interface, a mobile network interface in communication with processor 310, a bus configured to facilitate communication between the various components of user device 102, and/or a power source configured to power one or more components of user device 102. According to some embodiment, electronic gifts may be transmitted and stored using standard encryption techniques to add additional security. The various components of user device 102 may include the same or similar attributes or capabilities of the same or similar components discussed with respect to gift application server 120.

FIGS. 4A-B show example embodiments of user interfaces of a gift mobile application 402 being run on user device 102. According to some embodiments, gift mobile application 402 may be a software application that is configured to allow a gifter to create, customize and send a gift to a selected gift recipient using a first user device 102. According to some embodiments, a gift recipient may have a second user device 102 that may receive a gift sent by the gifter. In some embodiments, second user device 102 may receive the gift via gift mobile application 402 that is installed on second user device 102. In some embodiments, second user device 102 may not have gift mobile application 402 installed, but may be configured to receive the gift via, for example, an email or a text message. FIG. 4A shows an example embodiment of a user interface of gift mobile application 402 that is configured to allow a gifter to select a gift recipient and FIG. 4B shows an example embodiment of a user interface of gift mobile application 402 that is configured to allow a gifter to select and configure a gift to send to the selected gift recipient. According to some embodiments, gift mobile application 402 may facilitate communication between user device 102 and gift application server 120. In some embodiments, gift mobile application 402 may facilitate communication or the sending of messages between gifter user device 102 and gift recipient user device 102. For example, gift mobile application 402 may enable the gift recipient to record and send a thank you message to the gifter, or in some embodiments may initiate a telephonic or video link between gifter user device 102 and gift recipient user device 102 upon the gift recipient receiving or using the gift. According to some embodiments, if a telephonic or video link cannot be established immediately (e.g., due to a user being out of cell tower range), mobile application 402 may automatically attempt to establish the link upon detecting a user device 102 has reconnected to a network (e.g., Wi-Fi, cellular, etc.) or may intermittently try to establish the link upon after a period of time has passed.

According to some embodiments, user device 102 may provide gift mobile application 402 with access to a contacts list stored by user device 102, so that a user of gift mobile application 402 may select a stored contact as a gift recipient. As will be appreciated by those of skill in the art, a contacts list may comprise a plurality of records, where each record corresponds to an individual or entity and includes associated stored contact information such as a name, telephone number(s), address(es), and other such information. As shown in FIG. 4A, a user interface of gift mobile application 402 may allow a gifter to select a recent contact 404 as the gift recipient by selecting a displayed image or name associated with the recent contact 404. In some embodiments, a recent contact 404 may represent an individual that the gifter has given a gift to in the recent past via gift mobile application 402. In some embodiments, a recent contact 404 may represent an individual that a user has communicated with via user device 102 (e.g., via phone call, text message, email, etc.) in the recent past. According to some embodiments, a user interface of gift mobile application 402 may allow a gifter to specify a gift recipient by searching for a name of an individual using a text search field 406, which may cause gift mobile application 402 to perform a search of the contacts list stored on user device 102. According to some embodiments, a user interface of gift mobile application 402 may display some or all of a list of contacts 407 from which to select a gift recipient. In some embodiments, the displayed list of contacts 407 may be configured to scroll to reveal a different portion of the list in response to receiving a user input, such as a vertical swipe on a touchscreen of user device 102.

In some embodiments, gift mobile application 402 may be configured to allow a gifter to select a plurality of gift recipients and the gifter may specify whether an identical gift is to be sent to all of the gift recipients individually, or whether a single gift is to be sent to all of the gift recipients for their collective use. For example, a gifter may send three friends a gift of $100 to collectively spend at a particular restaurant, meaning that the gift will be exhausted when $100 is spent at the restaurant by any one of the gift recipients, or when the total amount of the gift is spent by adding up the expenditures of all three gift recipients at the restaurant. Furthermore, in some embodiments, a gifter may send a location-based group gift in which the gifter specifies a redemption location and conditions the gift on the occurrence that all gift recipients must be at the location to utilize the gift. For example, if a gifter wants two friends to meet for lunch, the gifter may create a gift to a particular restaurant but specify that both friends must be physically present at the restaurant in order for the gift to be used. In some embodiments, a gifter may specify an unknown gift recipient based on a specified merchant or location. For example, if a gifter is buying a cup of coffee and they want to buy a coffee for the person in line behind them, they may select a "pay it forward" feature of the gift mobile application 402 that may allow the gifter to provide a gift to the next person who makes a purchase from the location at which the gifter has just made a purchase, in which case system 100 may identify a user and/or financial account associated with the next transaction made at the merchant and provide the gift to that user in response to the transaction. In some embodiments, if the next person in line has a financial account with an entity associated with organization 108, then system 100 may be able to identify a financial account of the next person in line immediately as system 100 may have access to the person's financial records. In some embodiments, if the next person in line does not have a financial account associated with an entity associated with organization 108, then system 100 may identify the person's financial account based on an exchange with third party financial server 128, or may simply wait for the next purchase made by a person who does have a financial account associated with organization 108.

As shown in FIG. 4B, in some embodiments, a user interface of gift mobile application 402 may allow a gifter to select and/or configure a gift to send to a gift recipient by inputting or selecting a gift amount, which may also be referred to as a maximum gift amount, and one or more redemption locations. The gift amount may represent the maximum amount of value that may be withdrawn from an account associated with the gifter in relation to the gift. The one or more redemption merchants may represent merchants, ecommerce websites, stores, or locations at which the gift is authorized to be used. For example, the gift recipient may select a movie theater chain as the redemption merchant, which means that the gift recipient would only be authorized to redeem the gift at the specified movie chain. According to some embodiments, gift mobile application 402 may provide a number of predetermined gift amounts 408 that may be selected by the gifter. In some embodiments, the gifter may type in a customized gift amount via a gift amount input field. Gift mobile application 402 may provide a number of predetermined or recent redemption merchants 412 that may be selected by the gifter selecting an icon or button associated with the associated redemption merchant 412. According to some embodiments, gifter may search for redemption merchants by inputting the name of a desired redemption merchant into redemption merchant search field 412. According to some embodiments, gift application server 120 may store a list of redemption merchants that are compatible for use with system 100 and gift mobile application 402 may communicate with gift application server 120 in response to a search entered into redemption merchant search field 414 to receive search results. According to some embodiments, gift mobile application 402 may provide a list of redemption merchants 415 that may be displayed and manipulated in a manner similar to the list of contacts 407 shown in FIG. 4A. In some embodiments, gift mobile application 402 may allow a gifter to designate a type of redemption merchant instead of a particular redemption merchant. For example, instead of selecting a particular movie theater chain, the gifter may instead select "movie theaters," and system 100 may enable the gift to be used at a plurality of different movie theaters and chains of movie theaters based on a classification of the merchant determined by system 100 when the gift is redeemed.

Including and in addition to aspects shown in FIGS. 4A-B, in some embodiments, gift mobile application 402 may be configured to enable a gifter to specify or customize various other aspects of a gift, including, but not limited to, the gift recipient, the merchant identity, merchant type, redemption location, the amount of the gift, media associated with the gift (e.g., messages, images, videos, look and feel of the gift, artwork and the like sent in association with the gift), an account associated with the gifter from which to fund the gift, an account associated with the gift recipient for receiving payments or reimbursements relating to the gift, an expiration date and/or time of the gift after which the gift will no longer be valid for use, an authorized use date and/or time of the gift before which the gift may not be authorized for use, an electronic locking mechanism associated with the gift that is described in greater detail below. Further, in some embodiments, gift mobile application 402 may be configured to send and/or receive messages from giftram application server 120 or another user device 102. For example, in some embodiments, user device 102 associated with the gifter may receive notifications from application server 120 and/or user device 102 associated with the gift recipient, such as a notification that the gift recipient has redeemed the gift. Likewise, in some embodiments, user device 102 associated with the gift recipient may receive notification from application server 120 and/or user device 102 associated with the gifter, such as, for example, messages sent from the gifter or clues to assist in unlocking an electronic locking mechanism associated with a gift.

Figure 5B:
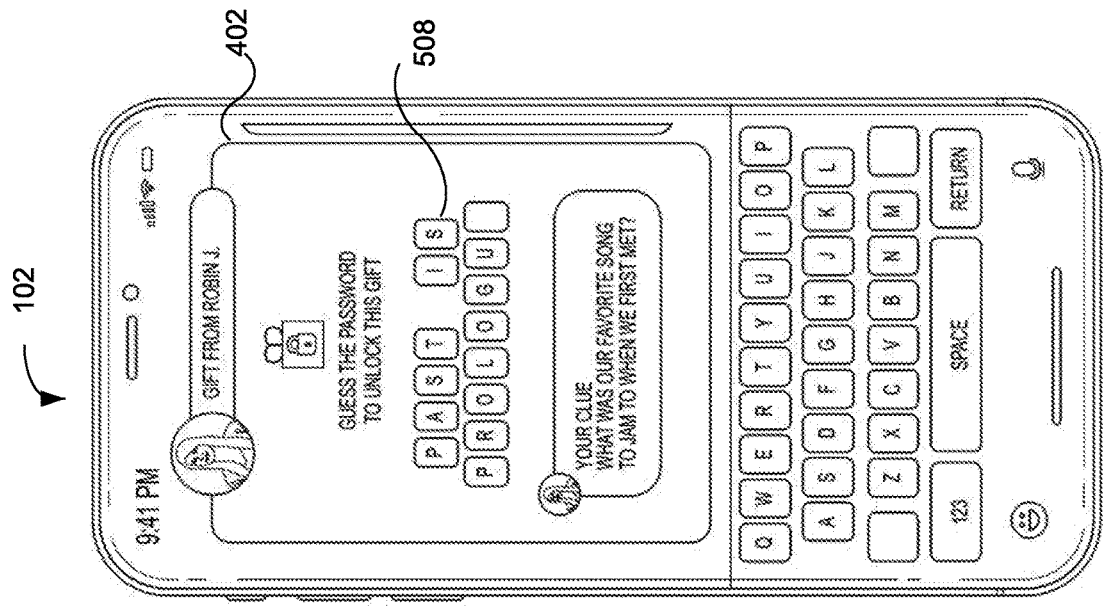
FIGS. 5A-B are exemplary embodiments of user interfaces of an electronic locking mechanism of a software application for providing gifts.
Figure 5A:
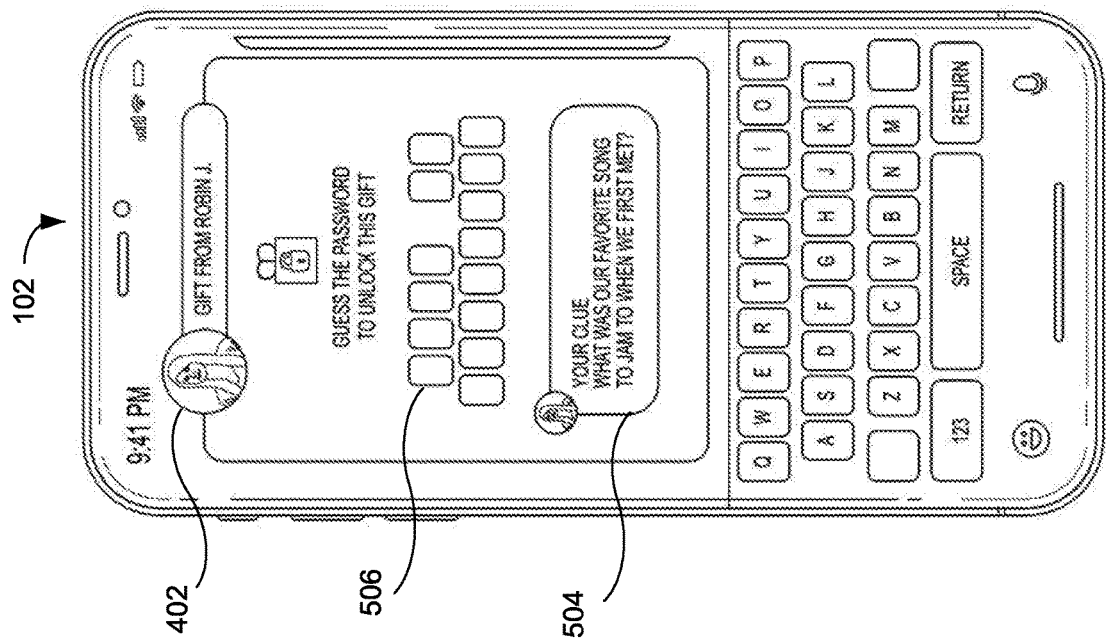

FIGS. 5A-B show example embodiments of electronic lock user interfaces of a gift mobile application 402 being run on user device 102. In particular, FIG. 5A shows an example embodiment of a user interface of gift mobile application 402 that is configured to present a gift recipient with an electronic lock and FIG. 5B shows an example embodiment of a user interface of gift mobile application 402 that shows user inputs to the electronic lock user interface that represent an attempt to unlock a gift being restricted for use by the electronic lock of gift mobile application 402.

As shown in FIG. 5A, an electronic lock may include an electronic lock prompt 504 and an electronic lock interface 506. According to some embodiments, electronic lock prompt 504 may represent a clue or instruction providing guidance to a gift recipient on how to solve the electronic lock. According to some embodiments, the electronic lock prompt 504 may be specified by the gifter at the time of creation of the gift by selecting a predetermined lock prompt 504 or by providing a customized lock prompt 504. In some embodiments, a lock prompt 504 may be associated with a lock solution that represents the input that must be entered into electronic lock interface 506 to unlock a gift, message, or other file that is being protected by the electronic lock. According to some embodiments, electronic lock interface 506 may comprise one or more fields that may receive user inputs, such as for example, a number of input boxes and spaces as shown in FIG. 5A. In some embodiments, the number of input boxes and spaces may be arranged and presented by electronic lock interface 506 to correspond to the number of characters and spacing associated with the lock solution. As shown in FIG. 5B, a gift recipient may input a lock input 508 to attempt to unlock the electronic lock. In the example shown in FIG. 5B, lock input 508 represents a song title corresponding to electronic lock prompt 504. According to some embodiments, gift mobile application 402 may locally store the lock solution associated with an electronic lock on user device 102. In such cases, gift mobile application 402 may unlock an associated file, such as an electronic gift, a media file, an image, a message, or any other such type of file, upon detecting that the gift solution has been correctly entered into electronic lock interface 506. According to some embodiments, upon detecting that an incorrect gift solution has been entered into electronic lock interface 506, gift mobile application 402 may cause user device 102 associated with the gift recipient to send an incorrect solution message to user device 102 associated with the gifter. The incorrect solution message may provide a notification that the gift recipient has entered an incorrect solution to the electronic lock and may provide the incorrect solution for the gifter's viewing and entertainment. According to some embodiments, the gift mobile application 402 may provide a messaging functionality that may allow the gifter to send additional clues to the gift recipient for viewing on user device 102. In some embodiments, gift mobile application 402 may provide a remote unlock functionality that allows the gifter to remotely unlock a gift sent to the gift recipient, so that the gifter may authorize the gift recipient to access and use the gift despite failed attempts at unlocking the gift. In some embodiments, gift mobile application 402 may be configured to enable a gifter to specify a maximum number of unlock attempts, such that in response to gift mobile application 402 determining that the gift recipient has incorrectly attempted to unlock the electronic lock beyond the maximum number of unlock attempts, then gift mobile application 402 may cancel the gift sent to the gift recipient and provide notifications to one or more of the gifter and the gift recipient that the gift has been cancelled due to the gift recipients failure to unlock the gift within the number of attempts specified by the gifter. According to some embodiments, an electronic lock may comprise an image that a user must trace or color in by swiping on a touchscreen associated with user device 102. For example, in some embodiments, the electronic lock may be configured to unlock if the gift recipient traces around a target image within an accuracy that falls within a predetermined confidence range.

While web server 110, location services server 112, transaction server 114, gift application server 120, merchant database terminal 126, merchant POS terminal 127, third party financial server 128 and user device 102 have been described as one form for implementing the techniques described herein, those having ordinary skill in the art will appreciate that other, functionally equivalent techniques may be employed. For example, as known in the art, some or all of the functionality implemented via executable instructions may also be implemented using firmware and/or hardware devices such as application specific integrated circuits (ASICs), programmable logic arrays, state machines, etc. Furthermore, other implementations of the web server 110, location services server 112, transaction server 114, gift application server 120, a merchant database terminal 126, merchant POS terminal 127, third party financial server or user device 102 may include a greater or lesser number of components than those illustrated.

Figure 6:
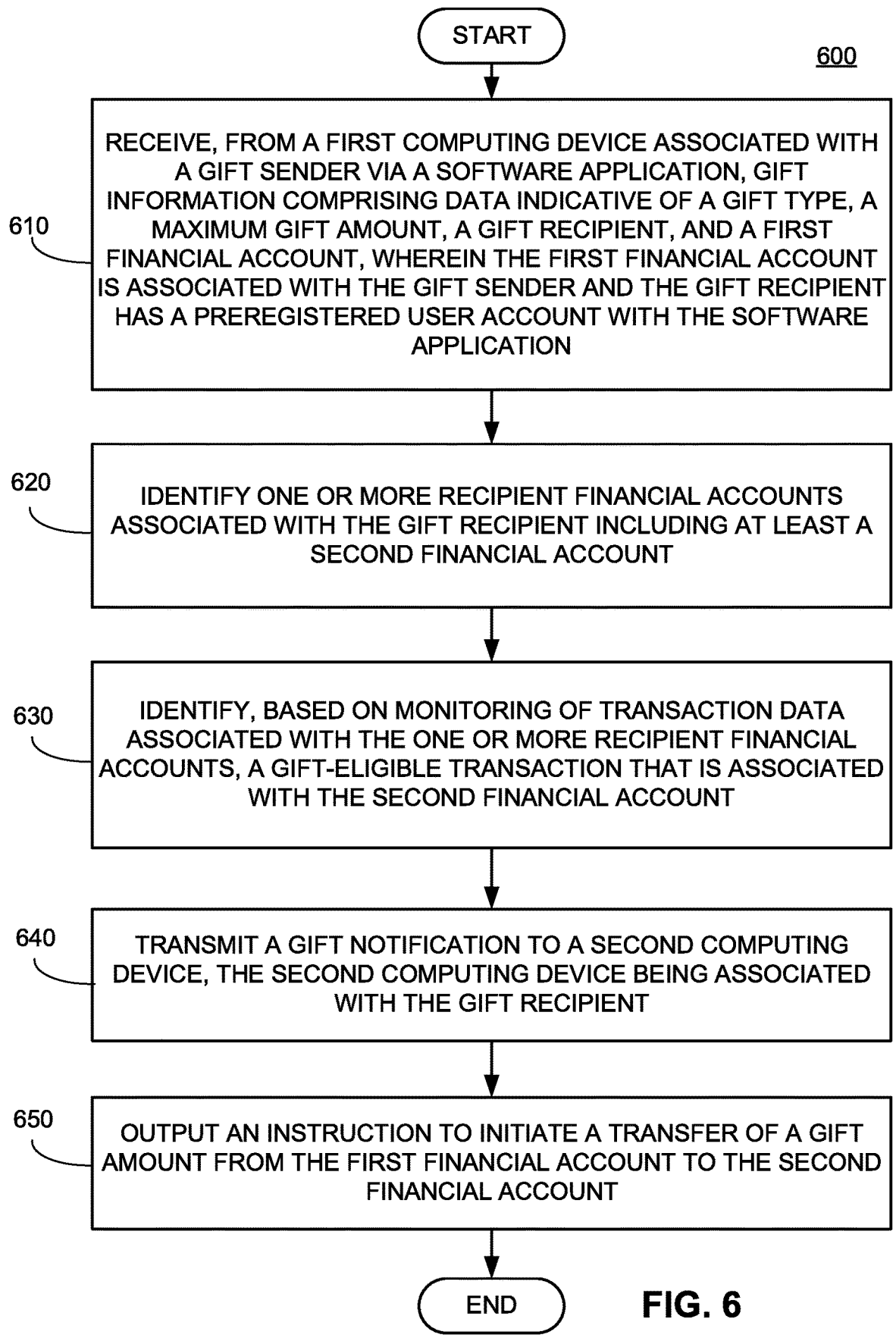
FIG. 6 is a flowchart of an exemplary method for providing a gift.

FIG. 6 shows a flowchart of a method 600 for providing a gift, such as an electronically conveyed financial gift. Method 600 may be performed by a system including some or all of web server 110, location services server 112, transaction server 114, database 118, gift application server 120, merchant database terminal 126, merchant POS terminal 127, third party financial server 128 and one or more user devices 102.

In block 610, the system (e.g., via gift application server 120) may receive gift information comprising data indicative of a gift type, a maximum gift amount, a gift recipient, and a first financial account. According to some embodiments, the gift information may be received from a first computing device (e.g., user device 102) associated with a gifter via a software application (e.g., gift mobile application 402). In some embodiments, the first financial account may be associated with the gifter and the gift recipient may have a preregistered user account with the software application. In some embodiments, the gift type may include an identification of one or more redemption merchants at which the gift is authorized to be used. For example, the gifter may specify that the gift may only be redeemed at particular merchants that are selected by the gifter during the gift creation process. In some embodiments, the one or more redemption merchants may be selected by the gifter, via, for example, gift mobile application 402 installed on user device 102. In some embodiments, the gift type may include a gift type category that corresponds to a plurality of redemption merchants, such as for example, restaurants, movie theaters, gas stations, grocery stores, and other such classifications of merchants.

In block 620, the system (e.g., via transaction server 114) may identify one or more recipient financial accounts associated with the gift recipient including at least a second financial account. In some embodiments, identifying one or more recipient financial accounts may include identifying one or more account numbers associated with the gift recipient's preregistered user account. For example, in some embodiments, gift recipient may have a preregistered user account with gift mobile application 402, in which the gift recipient has identified financial accounts of the gift recipient, such as credit cards, debit cards, checking accounts, and the like. According to some embodiments, the first financial account and the second financial account may be associated with a same financial institution. In some embodiments, the first financial account may be associated with a first financial institution and the second financial account may be associated with a second financial institution.

In block 630, the system (e.g., via transaction server 114) may identify, based on monitoring of transaction data associated with the one or more recipient financial accounts, a gift-eligible transaction that is associated with the second financial account. In other words, system 100 may identify an attempted transaction that was made using a known financial account of the gift recipient. According to some embodiments, monitoring of transaction data associated with the one or more accounts associated with the gift recipient may occur in real-time, if for example, the gifter financial account is associated with a financial institution that is associated with organization 108 such that organization 108 has real-time access to attempted transaction authorization request data. In some embodiments, monitoring of transaction data associated with the one or more accounts associated with the gift recipient may be performed by batch processing, if for example, the gifter financial account is associated with a financial institution that is not associated with organization 108 such that organization 108 may have access to or receive attempted transaction authorization request data from another entity following a delay, such as an entity associated with third party financial server 128. In some embodiments, the system may receive a merchant category code, a purchase amount, zip code, country code and/or a timestamp associated with a respective attempted transaction for each of a plurality of attempted transactions associated with the transaction data.

In some embodiments, identifying the gift-eligible transaction may include: identifying a merchant that is associated with each respective transaction based on the merchant code of each of the plurality of attempted transactions and determining that the merchant associated with the gift-eligible transaction matches one of the one or more redemption merchants. For example, if a gift is for use at a particular coffee shop, system 100 may determine that an attempted purchase is a gift-eligible purchase if system 100 determines that the attempted purchase was made at the coffee shop with a known financial account of the gift recipient. According to some embodiments, an instruction to initiate a transfer of a gift amount may be output in response to the system identifying a gift-eligible transaction that is associated with the second financial account. In some embodiments, the system may determine that the gift amount is equal to an attempted transaction amount associated with the gift-eligible transaction in response to determining that the attempted transaction amount is less than or equal to the maximum gift amount. In some embodiments, the system may determine that the gift amount is equal to the maximum gift amount in response to determining that the attempted transaction amount is greater than the maximum gift amount. For example, if the maximum gift amount (or a remaining balance of the gift if a previous gift amount has been redeemed) is $50 and the gift-eligible purchase is $20, then the gift amount may be $20, however if the gift-eligible purchase is $70 then the gift amount may be $50. Thus, the gifter will never pay more than the maximum gift amount initially specified during the creation of the gift and may only be charged for any portion of the gift when a gift-eligible transaction is identified by system 100.

In block 640, the system (e.g., via gift application server 112) may transmit a gift notification to a second computing device. In some embodiments, the second computing device may be associated with the gift recipient. According to some embodiments, the gift notification may include a message for display on the second computing device that identifies the gifter, the gift-eligible transaction, and a gift amount. For example, system 100 may send a message to the gift recipient's smart phone to inform the gift recipient that a purchase made by the gift recipient was paid for by the gifter via a reimbursement made from the gifter's financial account to the gift recipient's account.

In block 650, the system (e.g. via transaction server 114) may output an instruction to initiate a transfer of a gift amount from the first financial account to the second financial account. For example, system 100 may cause the gift amount to be transferred from a financial account of the gifter to a financial account of the gift recipient. According to some embodiments, the transfer may be an ACH transfer.

Figure 7:
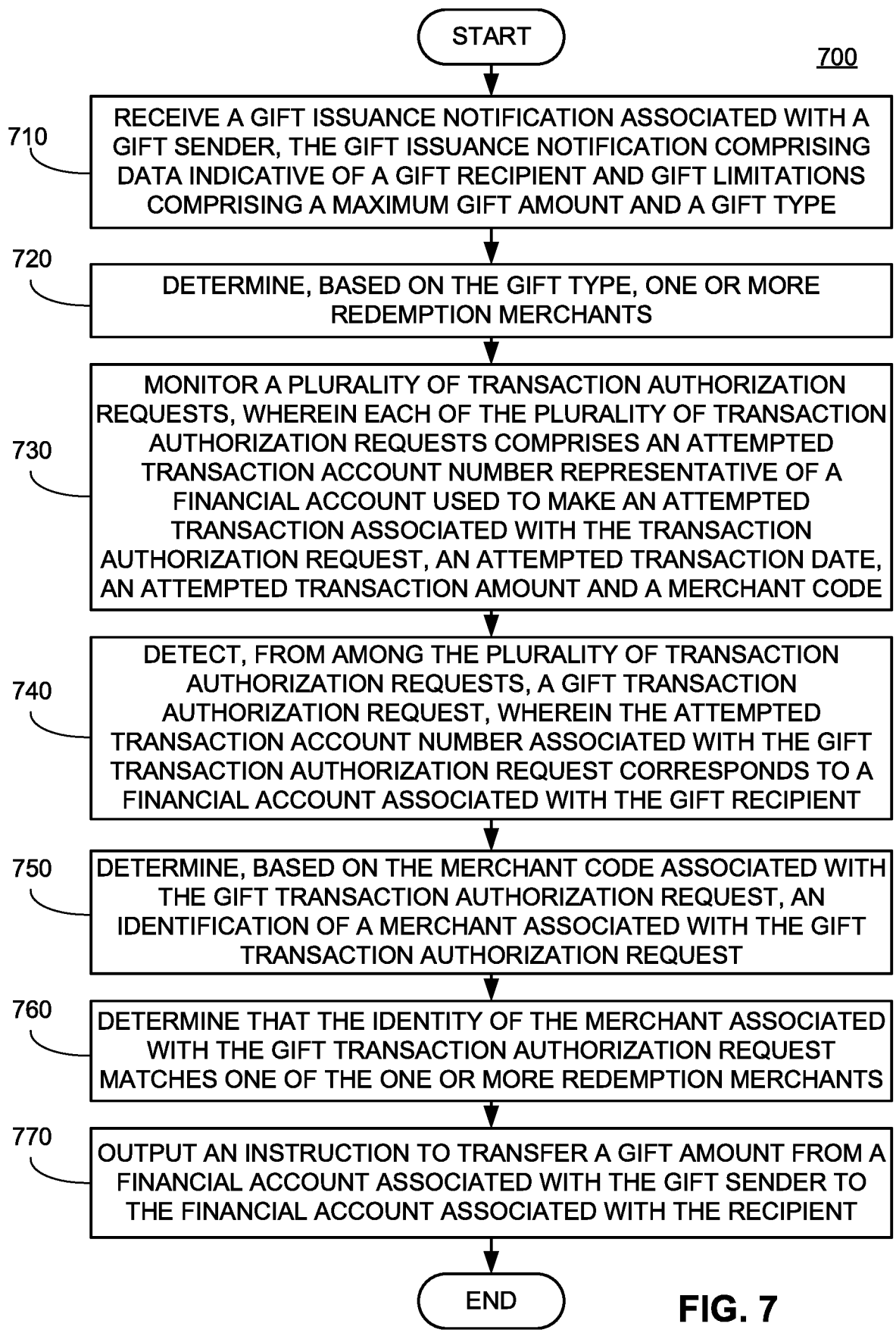
FIG. 7 is a flowchart of another exemplary method for providing a gift.

FIG. 7 shows a flowchart of a method 700 for providing a gift, such as an electronically conveyed financial gift. Method 700 may be performed by a system including some or all of web server 110, location services server 112, transaction server 114, database 118, gift application server 120, a merchant database terminal 126, merchant POS terminal 127, third party financial server 128 and one or more user devices 102.

In block 710, the system (e.g., via transaction server 114) may receive a gift issuance notification associated with a gifter. In some embodiments, the gift issuance notification may comprise data indicative of a gift recipient and gift limitations. According to some embodiments, the gift limitations may include one or more of a maximum gift amount, a gift type or an expiration date.

In block 720, the system (e.g., via transaction server 114) may determine one or more redemption merchants based on the gift type. In some embodiments, determining one or more redemption merchants may include searching a table to identify each merchant in the table that is associated with the gift type. For example, system 100 may store a table that provides a list of merchants that are each associated with a gift type.

In block 730, the system (e.g., via transaction server 114) may monitor a plurality of transaction authorization requests. According to some embodiments, each of the plurality of transaction authorization requests may include an attempted transaction account number representative of a financial account used to make an attempted transaction associated with the transaction authorization request, an attempted transaction date, an attempted transaction amount and a merchant code. For example, if the gift recipient makes a purchase at merchant POS terminal 127 using a credit card, merchant POS terminal 127 may generate a transaction authorization request that may be sent to transaction server 114. In some embodiments, merchant POS terminal 127 may send transaction authorization requests to third party financial server 128 if for example, the credit card used by the gift recipient is not associated with an entity that is associated with organization 108, and in such cases transaction server 114 may receive data associated with such transaction authorization requests from third party financial server 128.

In block 740, the system (e.g. via transaction server 114) may detect, from among the plurality of transaction authorization requests, a gift transaction authorization request, wherein the attempted transaction account number associated with the gift transaction authorization request corresponds to a financial account associated with the gift recipient. In this way, system 100 may identify an attempted purchase that is made by an account associated with the gift recipient. According to some embodiments, the system may determine one or more financial accounts associated with the gift recipient by accessing a preregistered user account associated with the gift recipient based on the data indicative of the gift recipient and identifying one or more financial accounts associated with the preregistered user account. For example, in some embodiments, the gift recipient may register a user account with gift mobile application 402 and as part of the registration process the gift recipient may input information sufficient to identify one or more financial accounts of the gift recipient. In some embodiments, the system may determine one or more financial accounts associated with the gift recipient by transmitting the data indicative of the gift recipient to a server associated with a third party financial institution and receiving data representative of one or more financial accounts associated with the gift recipient from the server associated with the third party financial institution. For example, in some embodiments, if the gift recipient is identified as John Doe and John Doe has a financial account that is associated with an entity that is not associated with organization 108, such as having a credit card with a different bank for example, system 100 may communicate with third party financial server 128 that is associated with the other bank to obtain account numbers or other such account identifying information that are associated with John Doe. According to some embodiments, system 100 may provide information relating to the gift recipient such as the gift recipient's name, address, phone number, identification number, or any other such identifying information that system 100 may have knowledge of from, for example, a user account associated with the gift recipient or an address book associated with user device 102 of the gifter, to third party financial server 128 to sufficiently identify the gift recipient in order to obtain financial account information associated with the gift recipient from third party financial server 128.

In block 750, the system (e.g., via transaction server 114) may determine, based on the merchant code associated with the gift transaction authorization request, an identification of a merchant associated with the gift transaction authorization request.

In block 760, the system (e.g. via transaction server 114) may determine that the identity of the merchant associated with the gift transaction authorization request matches one of the one or more redemption merchants. For example, if the gifter specified that the gift could be used at a particular coffee shop, system 100 may determine that an attempted purchase was made using an account associated with the gift recipient at the specified coffee shop in response to identifying the merchant associated with the attempted purchase as being the coffee shop based on the attempted transaction authorization request associated with the attempted purchase.

In block 770, the system (e.g. via transaction server 114) may output an instruction to transfer a gift amount from a financial account associated with the gifter to the financial account associated with the recipient. In some embodiments, prior outputting the instruction to transfer the gift amount, system 100 may first determine that all conditions associated with usage of the gift have been met. For example, if an expiration date has been set to be a condition of use of the gift, prior to outputting an instruction to transfer the gift amount, the system may determine that the attempted transaction date associated with the gift transaction authorization request occurs chronologically on or before the expiration date.

Figure 8:
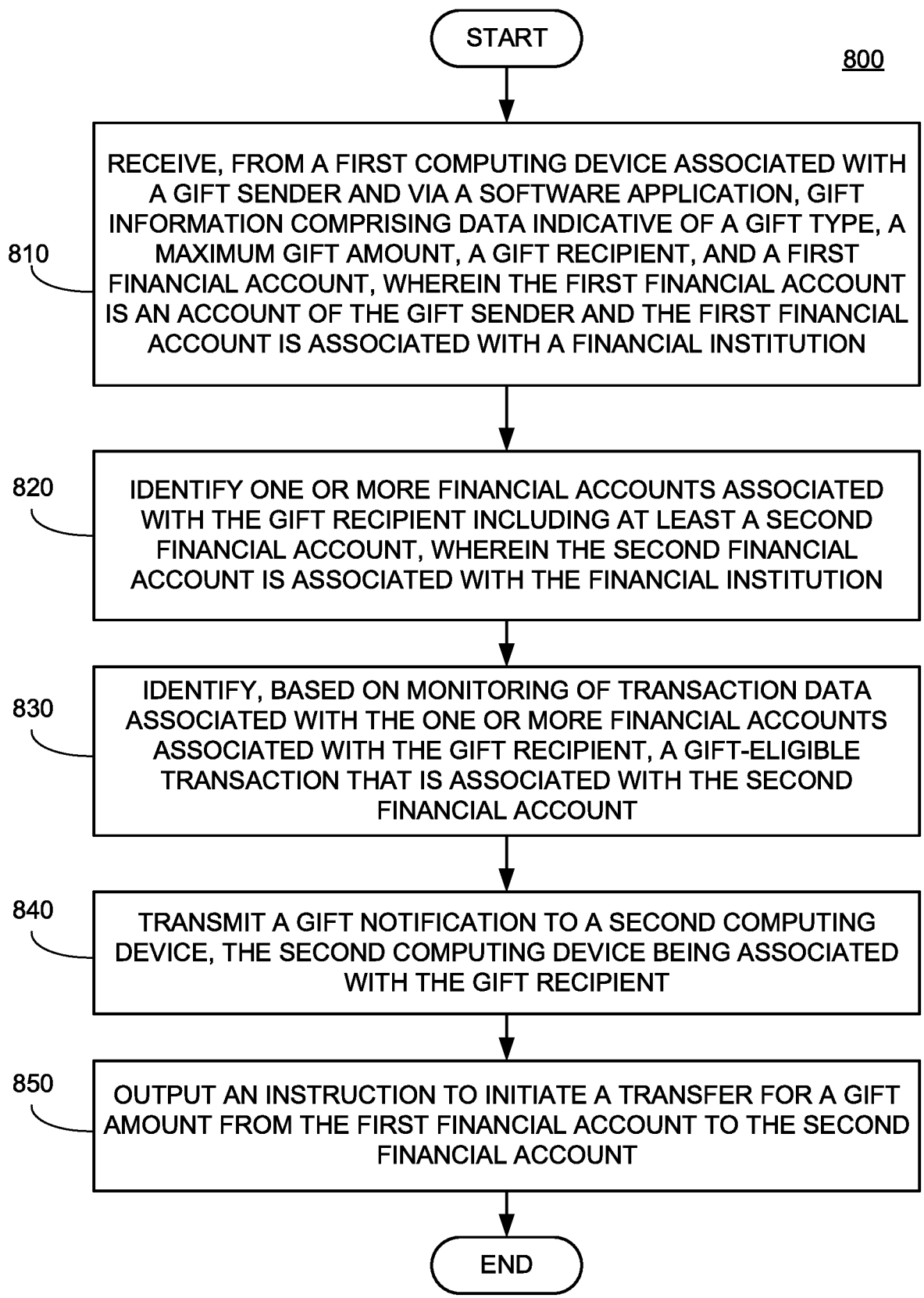
FIG. 8 is a flowchart of another exemplary method for providing a gift.

FIG. 8 shows a flowchart of a method 800 for providing a gift, such as an electronically conveyed financial gift. Method 800 may be performed by a system including some or all of web server 110, location services server 112, transaction server 114, database 118, gift application server 120, a merchant database terminal 126, merchant POS terminal 127, third party financial server 128 and one or more user devices 102.

In block 810, the system (e.g., via gift application server 120) may receive gift information from a first computing device associated with a gifter. According to some embodiments, the gift information may be received via a software application and may comprise data indicative of a gift type, a maximum gift amount, a gift recipient, and a first financial account. In some embodiments, the first financial account may be an account of the gifter and the first financial account may be associated with a financial institution. According to some embodiments, the data indicative of a gift recipient may include a name of the gift recipient.

In block 820, the system (e.g., via gift application server 120) may identify one or more financial accounts associated with the gift recipient including at least a second financial account. In some embodiments, the second financial account may be associated with the same financial institution as the first account. For example, the gifter may have a checking account and the gifter recipient may have a credit card that are issued or maintained by the same bank. According to some embodiments, identifying one or more financial accounts associated with the gift recipient may include accessing records of the financial institution (e.g., via transaction server 114 if the financial institution is associated with organization 108 or via third party financial server 128 if the financial institution is not associated with organization 108) to identify accounts associated with one or more individuals corresponding to the name of the gift recipient, retrieving identifying information associated with the one or more individuals corresponding to the name of the gift recipient, and receiving, from the first computing device, an indication of a selection of the gift recipient from the one or more individuals corresponding to the name of the gift recipient in response to transmitting the identifying information to the first computing device for display. In other words, in some embodiments, the gifter may input "John Doe" as the gift recipient via gift mobile application 402 and system 100 may access records of one or more financial institutions, retrieve identifying information individuals named "John Doe" that have financial accounts and present that identifying information via gift mobile application 402 on user device 102 to the gifter so that the gifter may select the correct "John Doe" so that system 100 may then associate the gift with the proper financial accounts. In some embodiments, identifying information may include one or more of a phone number, an address, a city of residence, an image, or a social media profile. In other words, for example, gift mobile application 402 may display information via user device 102 to the gifter such as the age, username, city/state of residence, occupation, or any other such information that is available in relation to each "John Doe" so that the gifter may select the correct individual as the gift recipient.

In block 830, the system (e.g., gift application server 120) may identify, based on monitoring of transaction data associated with the one or more financial accounts associated with the gift recipient, a gift-eligible transaction that may be associated with the second financial account. According to some embodiments, where a gift type has been specified in relation to the gift, identifying the gift-eligible transaction may include determining that an identity of a merchant associated with an attempted transaction of the transaction data associated with the one or more accounts associated with the gift recipient corresponds to one or more redemption merchants associated with the gift type. For example, if the gifter provides a gift for use at "restaurants," system 100 may determine that an attempted transaction made in association with a financial account of the gift recipient is a gift-eligible transaction if system 100 determines that the merchant at which the attempted transaction was made is associated with the category of "restaurants."

In block 840, the system (e.g. gift application server 120) may transmit a gift notification to a second computing device. In some embodiments, the second computing device may be associated with the gift recipient. For example, in some embodiments, following the identification of a gift-eligible transaction, the system may send the gift recipient a notification to inform the gift recipient that they have received a gift and that an associated purchase will be paid for via reimbursement by the gifter.

In block 850, the system (e.g. gift application server 120) may output an instruction to initiate a transfer for a gift amount from the first financial account to the second financial account in a manner similar to that described above with respect to block 650.

As used in this application, the terms "component," "module," "system," "server," "processor," "memory," and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology are described above with reference to user devices may include mobile computing devices. Those skilled in the art recognize that there are several categories of mobile devices, generally known as portable computing devices that can run on batteries but are not usually classified as laptops. For example, mobile devices can include, but are not limited to portable computers, tablet PCs, internet tablets, PDAs, ultra-mobile PCs (UMPCs), wearable devices, and smart phones. Additionally, implementations of the disclosed technology can be utilized with internet of things (IoT) devices, smart televisions and media devices, appliances, automobiles, toys, and voice command devices, along with peripherals that interface with these devices.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Exemplary Use Cases

The following exemplary use case describes an example of a typical user flow pattern. They are intended solely for explanatory purposes and not in limitation. A first person (the "gifter") may want to provide a gift to a friend (the "gift recipient") to a particular merchant, such as a particular restaurant. To create the gift, the gifter may open a mobile application (e.g., gift mobile application 402) on their smartphone (e.g., via user device 102) and use the mobile application to select the friend as the gift recipient. The gifter may specify which financial account they want to use to fund the gift ("gift account") by selecting, for example, a particular checking account that is associated with their user account in the mobile application. The gifter may select or input a maximum amount of the gift, such as $50, and may designate other restrictions, such as for example, that the gift may only be redeemed at the specified restaurant, or may only be redeemed at businesses that are classified as restaurants, or that the gift may be only be used before or after a certain date. After the user customizes the gift, the gifter's smartphone may send a notice to the system (e.g., gift application server 120) which may then create the gift by identifying financial accounts associated with the gift recipient so that the system (e.g., via transaction listener 115) may monitor financial transaction data to determine when a gift-eligible transaction has been made by the gift recipient, and upon detecting such a transaction the system may initiate a transfer of funds from a financial account of the gifter to a financial account of the gift recipient and notify the gift recipient of the gift. For example, if the gifter creates a gift to a particular store, the system may monitor transaction data, such as credit and debit card authorizations, to determine that the gift recipient has made a purchase at the specified store and then the system may cause the gift recipient to be reimbursed for the purchase by the gifter. In this way, the gifter can customize gifts that are sent to the gift recipient to be used at any particular store or location that the system is capable of identifying based on transaction authorization data, and the gifter may not have to pay for any portion of the gift until it is redeemed by the gift recipient. Further, the system may allow the gifter to choose whether to add an element of surprise to the gift by allowing the gifter to designate whether the system will notify the gift recipient of the gift at the time of creation of the gift, immediately following a gift-eligible purchase made by the gift recipient, or at another time designated by the gifter.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

The invention claimed is:

1. A method for providing a gift, comprising:
   receiving, from a first computing device associated with a gifter, gift information comprising gift recipient and a first financial account, wherein the first financial account is associated with the gifter;
   identifying one or more recipient financial accounts associated with the gift recipient including at least a second financial account;
   identifying, based on monitoring of transaction data associated with the one or more recipient financial accounts, a gift-eligible transaction that is associated with the second financial account;
   transmitting a gift notification and an electronic lock to a second computing device, the second computing device being associated with the gift recipient, wherein the electronic lock comprises an electronic lock prompt, wherein the electronic lock prompt comprises an electronic lock interface;
   receiving, from the second computing device via the electronic lock interface, an attempted lock solution;
   determining whether the attempted lock solution matches a lock solution;
   responsive to determining that the attempted lock solution matches the lock solution, outputting an instruction to initiate a transfer of a gift amount from the first financial account to the second financial account;
   responsive to determining that the attempted lock solution does not match the lock solution, transmit a failed attempt notification to the first computing device;
   receiving from the first computing device a remote unlock instruction; and
   outputting the instruction to initiate the transfer of the gift amount from the first financial account to the second financial account based on the remote unlock instruction.

2. The method of claim 1, wherein identifying one or more recipient financial accounts comprises identifying one or more account numbers associated with a preregistered user account of the gift recipient.

3. The method of claim 1, wherein the first financial account and the second financial account are associated with a same financial institution and monitoring of transaction data associated with the one or more accounts associated with the gift recipient occurs in real-time.

4. The method of claim 1, wherein the first financial account is associated with a first financial institution and the second financial account is associated with a second financial institution and monitoring of transaction data associated with the one or more accounts associated with the gift recipient is performed by batch processing.

5. The method of claim 1, wherein the gift type comprises an identification of one or more redemption merchants at which the gift is authorized to be used, the one or more redemption merchants being selected by the gifter.

6. The method of claim 5, further comprising: receiving, for each of a plurality of attempted transactions associated with the transaction data associated with the one or more accounts associated with the gift recipient, a merchant code associated with a respective attempted transaction.

7. The method of claim 6, wherein identifying the gift-eligible transaction comprises:
   identifying, based on the merchant code of each of the plurality of attempted transactions, a merchant associated with each respective transaction; and
   determining that the merchant associated with the gift-eligible transaction matches one of the one or more redemption merchants.

8. The method of claim 1, wherein the gift type comprises a gift type category that corresponds to a plurality of redemption merchants.

9. The method of claim 1, wherein the gift notification comprises a message for display on the second computing device that identifies the gifter, the gift-eligible transaction, and the gift amount.

10. The method of claim 1, wherein outputting an instruction to transfer the gift amount occurs in response to identifying the gift-eligible transaction that is associated with the second financial account.

11. The method of claim 1, further comprising:
   determining that the gift amount is equal to an attempted transaction amount associated with the gift-eligible transaction in response to determining that the attempted transaction amount is less than or equal to a maximum gift amount; and
   determining that the gift amount is equal to the maximum gift amount in response to determining that the attempted transaction amount is greater than the maximum gift amount.

12. A method for providing a gift, comprising:
   receiving a gift issuance notification associated with a gifter, the gift issuance notification comprising data indicative of a gift recipient and
   a gift type;
   determining, based on the gift type, one or more redemption merchants;

monitoring a plurality of transaction authorization requests, wherein each of the plurality of transaction authorization requests comprises: an attempted transaction account number representative of a financial account used to make an attempted transaction associated with the transaction authorization request;

an attempted transaction date;

an attempted transaction amount; and a merchant code;

detecting, from among the plurality of transaction authorization requests, a gift transaction authorization request, wherein the attempted transaction account number associated with the gift transaction authorization request corresponds to a financial account associated with the gift recipient;

determining, based on the merchant code associated with the gift transaction authorization request, an identification of a merchant associated with the gift transaction authorization request;

determining that the identity of the merchant associated with the gift transaction authorization request matches one of the one or more redemption merchants;

transmitting a gift notification and an electronic lock to a computing device associated with the gift recipient, wherein the electronic lock comprises an electronic lock prompt, wherein the electronic lock prompt comprises an electronic lock interface;

receiving, from the computing device associated with the gift recipient via the electronic lock interface, an attempted lock solution;

determining whether the attempted lock solution matches a lock solution;

responsive to determining that the attempted lock solution matches the lock solution, outputting an instruction to initiate a transfer of a gift amount from a financial account associated with the gifter to the financial account associated with the gift recipient;

responsive to determining that the attempted lock solution does not match the lock solution, transmit a failed attempt notification to a first computing device;

receiving from the first computing device a remote unlock instruction; and outputting the instruction to initiate the transfer of the gift amount from the financial account associated with the gifter to the financial account associated with the gift recipient based on the remote unlock instruction.

13. The method of claim 12, wherein determining one or more redemption merchants comprises searching a table to identify each merchant in the table that is associated with the gift type.

14. The method of claim 12, further comprising determining one or more financial accounts associated with the gift recipient by:

accessing, based on the data indicative of the gift recipient, a preregistered user account associated with the gift recipient; and identifying one or more financial accounts associated with the preregistered user account.

15. The method of claim 12, further comprising determining one or more financial account associated with the gift recipient by:

transmitting the data indicative of the gift recipient to a server associated with a third party financial institution; and receiving, from the server associated with the third party financial institution, data representative of one or more financial accounts associated with the gift recipient.

16. The method of claim 12, wherein the gift issuance notification further comprises data indicative of an expiration date, the method further comprising:

prior to outputting an instruction to transfer the gift amount, determining that the attempted transaction date associated with the gift transaction authorization request occurs chronologically on or before the expiration date.

17. A method for providing a gift, comprising:

receiving, from a first computing device associated with a gifter, gift information comprising data indicative of a gift type, a gift recipient, and a first financial account, wherein the first financial account is an account of the gifter;

identifying one or more financial accounts associated with the gift recipient including at least a second financial account;

identifying, based on monitoring of transaction data associated with the one or more financial accounts associated with the gift recipient, a gift-eligible transaction that is associated with the second financial account;

transmitting a gift notification and an electronic lock to a second computing device, the second computing device being associated with the gift recipient, wherein the electronic lock comprises an electronic lock prompt, wherein the electronic lock prompt comprises an electronic lock interface;

receiving, from the second computing device via the electronic lock interface, an attempted lock solution;

determining whether the attempted lock solution matches a lock solution;

responsive to determining that the attempted lock solution matches the lock solution, outputting an instruction to initiate a transfer for a gift amount from the first financial account to the second financial account;

responsive to determining that the attempted lock solution does not match the lock solution, transmit a failed attempt notification to the first computing device;

receiving from the first computing device a remote unlock instruction; and outputting the instruction to initiate the transfer of the gift amount from the first financial account to the second financial account based on the remote unlock instruction.

18. The method of claim 17, wherein the data indicative of a gift recipient comprises a name of the gift recipient and identifying one or more financial accounts associated with the gift recipient comprises:

accessing records of a financial institution to identify accounts associated with one or more individuals corresponding to the name of the gift recipient;

retrieving identifying information associated with the one or more individuals corresponding to the name of the gift recipient; and receiving, from the first computing device, an indication of a selection of the gift recipient from the one or more individuals corresponding to the name of the gift recipient in response to transmitting the identifying information to the first computing device for display.

19. The method of claim 18, wherein the identifying information comprises one or more of a phone number, an address, a city of residence, an image, or a social media profile.

20. The method of claim 17, wherein identifying the gift-eligible transaction comprises:
    determining that an identity of a merchant associated with an attempted transaction of the transaction data associated with the one or more accounts associated with the gift recipient corresponds to one or more redemption merchants associated with the gift type.

\* \* \* \* \*